(12) United States Patent
Chang

(10) Patent No.: US 10,095,350 B2
(45) Date of Patent: *Oct. 9, 2018

(54) PROCESSING DEVICE AND PROCESSING METHOD

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 67 days.

This patent is subject to a terminal disclaimer.

(21) Appl. No.: 15/398,263

(22) Filed: Jan. 4, 2017

(65) Prior Publication Data

US 2017/0115816 A1    Apr. 27, 2017

Related U.S. Application Data

(63) Continuation of application No. 14/537,242, filed on Nov. 10, 2014.

(60) Provisional application No. 61/902,137, filed on Nov. 8, 2013.

(30) Foreign Application Priority Data

Dec. 31, 2013   (TW) .............................. 102149224 A

(51) Int. Cl.
G06F 3/044    (2006.01)
G06F 3/041    (2006.01)
G06F 3/0354   (2013.01)

(52) U.S. Cl.
CPC ........ *G06F 3/0416* (2013.01); *G06F 3/03545* (2013.01); *G06F 3/044* (2013.01); *G06F 2203/04101* (2013.01); *G06F 2203/04104* (2013.01)

(58) Field of Classification Search
CPC ........ G06F 3/041; G06F 3/0416; G06F 3/044; G06F 3/0354; G06F 2203/04104; G06F 2203/04101

See application file for complete search history.

(56) References Cited

U.S. PATENT DOCUMENTS

| 9,013,429 B1 | 4/2015 | Krekhovetskyy et al. |
| 2006/0181344 A1 | 8/2006 | Ksienski et al. |
| 2012/0002754 A1 | 1/2012 | Matsuura |
| 2013/0021291 A1 | 1/2013 | Kremin et al. |

FOREIGN PATENT DOCUMENTS

WO    2013012993    1/2013

*Primary Examiner* — Towfiq Elahi
(74) *Attorney, Agent, or Firm* — WPAT, PC

(57) ABSTRACT

The present invention provides a processing device, which includes a plurality of digital demodulators and an information transmitting module. Each of the digital demodulators is configured to generate in-phase and quadrature signal information corresponding to a frequency. The information transmitting module is configured to receive, process, and transmit the in-phase and quadrature signal information.

12 Claims, 13 Drawing Sheets

PROCESSING DEVICE AND PROCESSING METHOD

CROSS REFERENCES TO RELATED APPLICATIONS

The present invention is a continuation application of U.S. patent application Ser. No. 14/537,242, filed on Nov. 10, 2014.

BACKGROUND OF THE INVENTION

1. Field of the Invention

The present invention relates to touch sensitive systems and more particularly, to a touch processing device and processing method.

2. Description of the Prior Art

Touch sensitive panels or screens are important human-machine interfaces, especially for consumer electronic products like portable phones, tablet PCs, or Personal Digital Assistances (PDAs). Touch sensitive screens are one of the main input/output (I/O) devices. As capacitive touch sensitive screens, especially those of projected capacitive types, are highly sensitive to finger touches, it has become one of the main design choices for touch sensitive panels/screens on the market. Touching the screen with the tip of a finger will inevitably block part of the screen, and the user will not be able to visually confirm a point that is being detected by the touch sensitive. In addition, one cannot have as accurate control as using a pen (or stylus) when using their finger tip(s) to write. Therefore, in addition to using finger tips for touch control, users may also wish to use a stylus for input to the screen.

Generally, the area on a touch sensitive screen touched by the tip of a stylus is much smaller than that touched by the fingertips. For capacitive touch sensitive screens, it has been a challenge to detect the capacitive changes caused by a stylus. In particular, in many professional graphics or typesetting application environments, a lot of functional buttons needs to be added in the design process of the stylus. In view of this demand, the touch sensitive screen not only needs to detect the tiny tip of the stylus, but also needs to determine whether these buttons are being pressed.

Detecting a stylus that is capable of mixing a plurality of frequencies would require several demodulators, and each demodulator needs to perform complex floating point operations. As a result, a large chip area would be occupied. In view of the above, there is a need on the market for a cost-saving touch processing device that is capable of detecting a stylus with multiple frequencies without occupying a large chip area.

SUMMARY OF THE INVENTION

In an embodiment, the present invention provides a processing device, which may include a plurality of digital demodulators and an information transmitting module. Each of the digital demodulators is configured to generate in-phase and quadrature signal information corresponding to a frequency. The information transmitting module is configured to receive, process, and transmit the in-phase and quadrature signal information generated by the plurality of digital demodulators.

In another embodiment, the present invention provides a processing method, which may include simultaneously performing a plurality of digital demodulation steps, each digital demodulation step generating in-phase and quadrature signal information corresponding to a frequency; and performing an information transmitting step including receiving, processing and transmitting the in-phase and quadrature signal information generated by the plurality of digital demodulation steps.

In summary, one of the main principles of the present invention is to simplify the sampling and computing performed by the digital demodulators, and to gather the more complicated operations into a single digital transmission interface, or even a mainframe with more abundant computing resources. As such, the chip area occupied by each of the demodulators can be minimized.

DETAILED DESCRIPTION OF THE PREFERRED EMBODIMENTS

Figure 1:
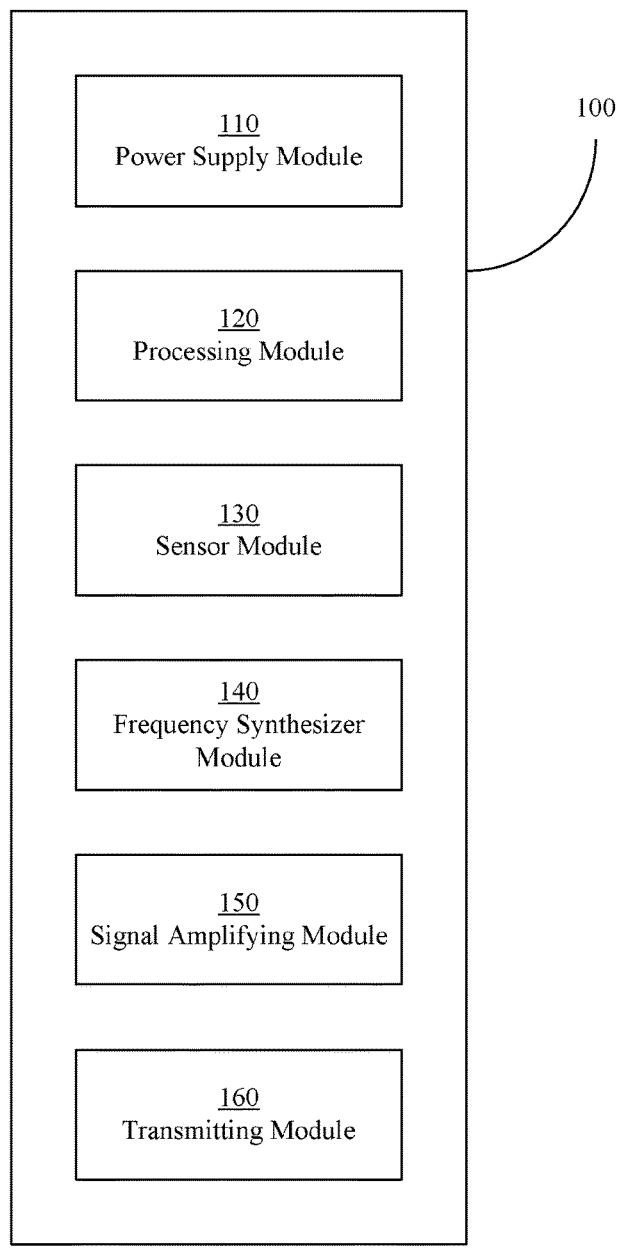
FIG. 1 is a schematic diagram illustrating a transmitter in accordance with an embodiment of the present invention.

The present invention is described in details with reference to some embodiments below. However, in addition to the disclosed embodiments, the scope of the present invention is not limited by these embodiments, rather by the scope of the claims. Moreover, in order for one with ordinary skills in the art to have a better understanding and clarity of the descriptions, some components in the drawings may not necessary be drawn to scale, in which some may be exaggerated relative to others, and irrelevant parts are omitted.

In an embodiment, the transmitter mentioned in the present invention may be a stylus. In some embodiments, the transmitter may be other types of objects that can be placed on a touch sensitive panel or screen. For example, when the touch sensitive screen displays a chessboard, the transmitter may be the chess. Once the game program detects the location of the chess on the touch sensitive screen, it will know the location of the chess.

Regardless of how much contact area there is between the transmitter and the touch sensitive panel and how many touch points there are, the transmitter at least includes a transmitting anchor point. The touch sensitive panel or screen may detect the location of the transmitting anchor point as the representative location of an object represented by the transmitter on the touch sensitive panel or screen. In an embodiment, the transmitter does not need to come into contact with the touch sensitive panel, only the transmitting anchor point needs to be in proximity to the touch sensitive panel for the touch sensitive panel to detect the transmitting anchor point.

In an embodiment, the transmitter may include a plurality of transmitting anchor points. When the touch sensitive panel detects a plurality of transmitting anchor points, it is able to detect the facing direction of the transmitter. In another embodiment, the transmitter may include m transmitting anchor points, and when the touch sensitive panel detects n of the transmitting anchor points, it is able to detect the stance of the transmitter on the touch sensitive panel. For example, the transmitter is a triangular body with four transmitting anchor points; each transmitting anchor point is positioned at one vertex of the triangular body, by detecting three transmitting anchor points on the touch sensitive panel, the touch sensitive panel will be able to know which face of the triangular body is in contact with it. The transmitter may also be a square body with eight transmitting anchor points, where each transmitting anchor point is positioned at a vertex of the square body. This type of transmitter can be used as a dice.

Referring to FIG. 1, a schematic diagram illustrating a transmitter 100 in accordance with an embodiment of the present invention is shown. The transmitter 100 includes a power supply module 110, a processing module 120, a sensor module 130, a frequency synthesizer module 140, a signal amplifying module 150 and a transmitting module 160. As mentioned above, the transmitter 100 may assume the shape of a stylus. In an embodiment, the above modules may be arranged inside the stylus according to the order shown in FIG. 1, the bottom of the stylus is to be in contact with or proximity to a touch sensitive panel. The transmitter 100 may include a master switch for turning on/off the power of the transmitter 100.

The power supply module 110 may include circuits associated with power supply and control, such as a battery pack, a DC-to-DC voltage converter, a power management unit and the like. The battery pack can be rechargeable batteries or disposable batteries. When the battery pack includes rechargeable batteries, the power supply module 110 may further include a charger circuit for inputting an external power into the rechargeable batteries. In an embodiment, the charger circuit can be included in the power management unit for protecting the rechargeable batteries from over discharging and over charging.

The above processing module 120 is used for controlling the transmitter 100, and may include a microprocessor. The above sensor module 130 may include at least one sensor. The sensor may, for example, include a pressure sensor at the tip of the stylus, a button, an accelerometer, an inductance meter, a knob, or the like. The status of the sensor may be in binary form. For example, the button may be in either a pressed-down status or a released status. The statuses of an accelerometer may include stationary and in motion. The statuses of the sensor may include n-ary discrete values. For example, the pressure experienced by the pressure sensor may be divided into four levels, ten levels, or sixteen levels. The statuses of the knob may also be in four levels, ten levels, or sixteen levels. The status of the sensor can also be an analog interval. The above processing module 120 is able to detect the status of the sensor in the sensor module 130, and generate a transmitter status accordingly.

The above frequency synthesizer module 140 includes a plurality of frequency generators and a frequency synthesizer or mixer. In one embodiment, the above plurality of frequency generators may include a plurality of quartz oscillators. In another embodiment, the above frequency generators can use a single frequency source, and generate a plurality of frequencies through the use of dividers, frequency multipliers, phase lock circuits and other appropriate circuitries. These frequencies are not mutually resonant frequency waves, and different from and not mutually resonant with the frequency emitted by the touch sensitive panel for detecting the transmitter 100. This avoids interference between the various frequencies.

In some embodiments, the ranges of the plurality of frequencies fall within the detectable frequency range of the touch sensitive panel. For example, a frequency range that generally can be detected by a touch sensitive panel is approximately between 90 kHz and 250 kHz, so the frequencies generated by the plurality of frequency generators may fall within this range.

In an embodiment, the above processing module 120 may decide which frequencies in the plurality of frequencies are to be synthesized by the frequency synthesizer module 140. In other words, a specific frequency can be controlled not to be added to the mixer. Of course, the signal strength of an individual frequency may also be controlled. In another embodiment, the above processing module 120 may decide the ratios of the signal strengths of the various frequencies for the frequency synthesizer module 140. For example, the ratio of the signal strength of a first frequency to that of a second frequency may be 3:7. As another example, the ratio of the signal strengths between a first, a second and a third frequency may be 24:47:29. One with ordinary skills in the art can appreciate that although the frequency synthesizer module 140 can be used for generating and mixing multiple frequencies, the processing module 120 may also instruct the frequency synthesizer module 140 to generate a single frequency without mixing with any other frequencies based on the statuses of the sensors in the sensor module 130.

In an embodiment, the signal strength of a particular frequency may correspond to a pressure sensor at the tip of the stylus or a knob with multiple levels in the sensor module 130. For example, in a graphics software, the pressure sensor at the tip of a stylus may indicate the shades of the color, and the degree of rotation of the knob may indicate the diameter of the brush. Thus, the signal strength of a first frequency can be used to indicate the pressure on the pressure sensor, and the signal strength of a second frequency can be used to indicate the degree of rotation of the knob.

In another embodiment, the proportion of the signal strength of one frequency among the signal strength of the mixed frequencies can be used to correspond to one of the n-ary statuses of a sensor. For example, when the ratio of the signal strengths of a first frequency to a second frequency is 3:7, it indicates the status of the sensor is in the third level among ten levels. If the ratio of the strengths is changed to 6:4, this indicates the status of the sensor is in the sixth level among ten levels. In other words, if there are three frequencies, then the ratio of the signal strengths of a first frequency to a second frequency, the ratio of the signal strengths of the second frequency to a third frequency, and the ratio of the signal strengths of the third frequency to the first frequency can be used to indicate three statuses of the n-ary sensor, respectively.

The above signal amplifying module 150 is used for amplifying the signal mixed by the frequency synthesizer module 140. In an embodiment, the above signal amplification corresponds to the pressure sensor in the sensor module 130 at the tip of the stylus. If the circuit of the pressure sensor corresponds to a variable gain amplifier (VGA) of the signal amplifying module 150, the circuit of the pressure sensor may directly control the gain of the VGA without going through the processing module 120. Therefore, the mixed signal outputted by the frequency synthesizer module 140 can be amplified by the VGA and sent to the transmitting module 160.

As mentioned before, the signal strength of a particular frequency in the mixed signal can be used to indicate a status of an n-ary sensor. The ratio of the signal strengths of two frequencies in the mixed can also be used to indicate a status of another n-ary sensor. Meanwhile, the signal amplifying module 150 can be use to amplify the mixed signal to indicate the status of yet another n-ary sensor. For example, the transmitter 100 includes two n-ary sensors: one is a pressure sensor provided at the tip of the stylus, and the second one is a knob provided on the body of the stylus, they are used to indicate the color shade and the diameter of the stylus, respectively. In an embodiment, the strength of the mixed signal can be used to indicate the degree of pressure experienced by the pressure sensor. The status of the knob can be indicated by the ratio of the signal strengths of two frequencies in the mixed signal.

In an embodiment of the present invention, the transmitting module 160 includes a pressure sensor provided at the tip of the stylus. The transmitting module 160 can be an array of antennas or a conductor or an electrode with the appropriate impedance value, which can also be called an excitation electrode. The conductor or electrode at the tip of the stylus is connected to the pressure sensor. When the transmitting module 160 emits a signal and touches the touch sensitive panel/screen, the signal will flow into the sensing electrodes of the touch sensitive panel/screen. When the transmitting module 160 is near but not in contact with the touch sensitive panel/screen, the sensing electrodes of the touch sensitive panel/screen may still experience the signal variations on the transmitting module 160, thereby allowing the touch sensitive/panel to detect the approaching of the transmitter 100.

When the frequency synthesizer module 140 synthesizes n frequencies, the frequencies of the signal can be used to modulate $2^n$ statues. For example, when n equals to three, the frequencies of the signal can be used to modulate eight statues. Referring to Table 1, the transmitter statuses and their corresponding statuses of the sensors are shown.

TABLE 1

|  | Pressure Sensor | First Button | Second Button |
|---|---|---|---|
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Fifth Transmitter Status | No Contact Pressure | Released | Released |
| Sixth Transmitter Status | No Contact Pressure | Pressed | Released |
| Seventh Transmitter Status | No Contact Pressure | Pressed | Pressed |
| Eighth Transmitter Status | No Contact Pressure | Released | Pressed |

In the embodiment shown by Table 1, the sensor module 130 includes three sensors: a pressure sensor at the tip of the stylus, a first button and a second button. The status of these three sensors are all in binary forms, so there are eight different combinations of transmitter statuses in total, as shown in Table 1. One with ordinary skills in the art can appreciate that the correspondence between the transmitter statuses and the sensors' statuses can be arbitrarily changed. For example, the first transmitter status can swap with another transmitter status, for example, the seventh transmitter status.

Referring to Table 2, the transmitter statuses and their corresponding frequency mixings are shown. As described before, the frequency synthesizer module 140 may synthesize three different frequencies, so each transmitter status may correspond to a different combination of the frequencies as shown in Table 2. One with ordinary skills in the art can appreciate that the correspondence between the transmitter statuses and the combinations of frequencies can be arbitrarily changed. For example, the first transmitter status can swap with another transmitter status, for example, the eighth transmitter status.

TABLE 2

|  | First Frequency | Second Frequency | Third Frequency |
|---|---|---|---|
| First Transmitter Status | Mixed | Mixed | Mixed |
| Second Transmitter Status | Mixed | Mixed | Not Mixed |
| Third Transmitter Status | Mixed | Not Mixed | Not Mixed |
| Fourth Transmitter Status | Mixed | Not Mixed | Mixed |
| Fifth Transmitter Status | Not Mixed | Mixed | Mixed |
| Sixth Transmitter Status | Not Mixed | Mixed | Not Mixed |
| Seventh Transmitter Status | Not Mixed | Not Mixed | Not Mixed |
| Eighth Transmitter Status | Not Mixed | Not Mixed | Mixed |

In an embodiment, when the pressure sensor at the tip of the stylus is not under any pressure, the transmitter 100 still mixes the frequencies and sends out a signal. In another embodiment, when the pressure sensor at the tip of the stylus is not under any pressure, the transmitter 100 does not mix the frequencies and transmit any signal. With respect to Table 2, this status is the seventh transmitter status. In this embodiment, Table 1 can be altered into Table 3.

TABLE 3

|  | Pressure Sensor | First Button | Second Button |
|---|---|---|---|
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Seventh Transmitter Status | No Contact Pressure | Released | Released |

TABLE 3-continued

|  | Pressure Sensor | First Button | Second Button |
|---|---|---|---|
| Seventh Transmitter Status | No Contact Pressure | Pressed | Released |
| Seventh Transmitter Status | No Contact Pressure | Pressed | Pressed |
| Seventh Transmitter Status | No Contact Pressure | Released | Pressed |

In the embodiments shown in Table 1 to Table 3, the transmitter 100 uses the synthesizing of the frequencies as the only factor of signal modulation. In the following embodiments, in addition to frequency synthesizing, signal strength and/or ratio of signal strengths of different frequencies are included as the factors of signal modulation.

Referring to Table. 4, transmitter frequency statuses and their corresponding sensors' statuses in accordance with an embodiment of the present invention are shown. Compared to the embodiment shown in Table 1, the statues sensed by the pressure sensor are not limited to two statuses (i.e. contact pressure/no contact pressure), but more than two statuses. Thus, the left column of Table 4 is not called transmitter status anymore, but rather transmitter frequency status. The modulation factors of the transmitter status of this embodiment include, in addition to the frequency status, the signal strength as well.

TABLE 4

|  | Pressure Sensor | First Button | Second Button |
|---|---|---|---|
| First Transmitter Frequency Status | Contact Pressure Level > 0 | Released | Released |
| Second Transmitter Frequency Status | Contact Pressure Level > 0 | Pressed | Released |
| Third Transmitter Frequency Status | Contact Pressure Level > 0 | Pressed | Pressed |
| Fourth Transmitter Frequency Status | Contact Pressure Level > 0 | Released | Pressed |
| Fifth Transmitter Frequency Status | Contact Pressure Level = 0 | Released | Released |
| Sixth Transmitter Frequency Status | Contact Pressure Level = 0 | Pressed | Released |
| Seventh Transmitter Frequency Status | Contact Pressure Level = 0 | Pressed | Pressed |
| Eighth Transmitter Frequency Status | Contact Pressure Level = 0 | Released | Pressed |

Referring to Table 5, transmitter statuses and their corresponding frequency mixings and signal strengths in accordance with an embodiment of the present invention are shown. The signal strength modulation can be the signal strength value of the mixed signal to indicate, for example, the contact pressure level of the pressure sensor.

TABLE 5

|  | First Frequency | Second Frequency | Third Frequency |
|---|---|---|---|
| First Transmitter Frequency Status + Signal Strength Modulation | Mixed | Mixed | Mixed |
| Second Transmitter Frequency Status + Signal Strength Modulation | Mixed | Mixed | Not Mixed |
| Third Transmitter Frequency Status + Signal Strength Modulation | Mixed | Not Mixed | Not Mixed |
| Fourth Transmitter Frequency Status + Signal Strength Modulation | Mixed | Not Mixed | Mixed |
| Fifth Transmitter Frequency Status + Signal Strength Modulation | Not Mixed | Mixed | Mixed |
| Sixth Transmitter Frequency Status + Signal Strength Modulation | Not Mixed | Mixed | Not Mixed |
| Seventh Transmitter Frequency Status + Signal Strength Modulation | Not Mixed | Not Mixed | Not Mixed |
| Eighth Transmitter Frequency Status + Signal Strength Modulation | Not Mixed | Not Mixed | Mixed |

In the embodiment of Table 5, the contact pressure levels of the pressure sensor corresponding to the fifth to the eighth transmitter frequency statues are all zero, so the results of signal strength modulation can also be zero. In other words, no signal is transmitted. In another embodiment, such a signal strength modulation can be a constant. This constant signal strength can be different from the signal strengths corresponding to other contact pressure levels of the pressure sensor.

Figure 2:
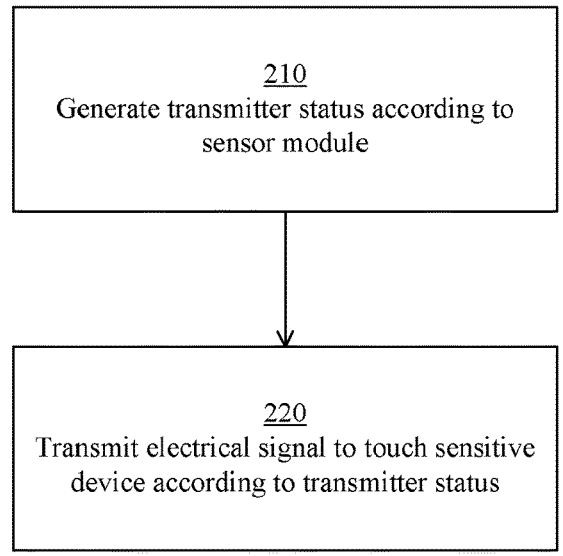
FIG. 2 is a flowchart illustrating a transmitting method in accordance with an embodiment of the present invention.

Referring to FIG. 2, a flowchart illustrating a transmitting method in accordance with an embodiment of the present invention is shown. The transmitting method is applicable to the transmitter 100 shown in FIG. 1, but not limited thereto. The transmitting method includes two steps. In step 210, a transmitter status is generated based on a status inside a sensor module included in the transmitter. In step 220, an electrical signal is transmitted to a touch sensitive device according to the transmitter status, so that after analyzing the electrical signal, the touch sensitive device is able to find out the transmitter status and a relative position of the transmitter with respect to the touch sensitive device. The electrical signal is mixed from a plurality of signals having different frequencies.

In an embodiment, a sensor inside the sensor module includes one of the following: a button, a knob, a pressure sensor (or a pressure gauge), an accelerometer or a gyroscope. The pressure sensor can be used to sense the contact pressure level between the transmitter and the touch sensitive device.

When the sensor module includes a plurality of sensors, the number of possible statues of the transmitter status is the sum of the number of possible statues of every sensor. Alternatively, in another embodiment, the transmitter status indication is one of arbitrary combinations of every sensor's status indication. In an embodiment, the status indication of a sensor inside the sensor module is the nth power of two, wherein n is an integer greater than or equal to 0.

The modulation factor of the electrical signal includes one or a combination of: frequency and strength. In an embodiment, the total signal strength of the electrical signal corresponds to a status of an n-ary sensor in the sensor module. In another embodiment, the ratio of signal strengths of a first frequency to a second frequency mixed in the electrical signal corresponds to a status of an n-ary sensor in the sensor module. In yet another embodiment, the total signal strength of the electrical signal corresponds to a status of a first n-ary sensor in the sensor module, wherein the ratio of the signal strengths of a first frequency to a second frequency mixed in the electrical signal corresponds to a status of a second n-ary sensor in the sensor module.

One main principle of the present invention lies in the use of an electrical signal mixed from a plurality of frequencies, so that a touch sensitive device may be able to detect the position of a transmitter transmitting the electrical signal and the status of at least one sensor on the transmitter.

Figure 3:
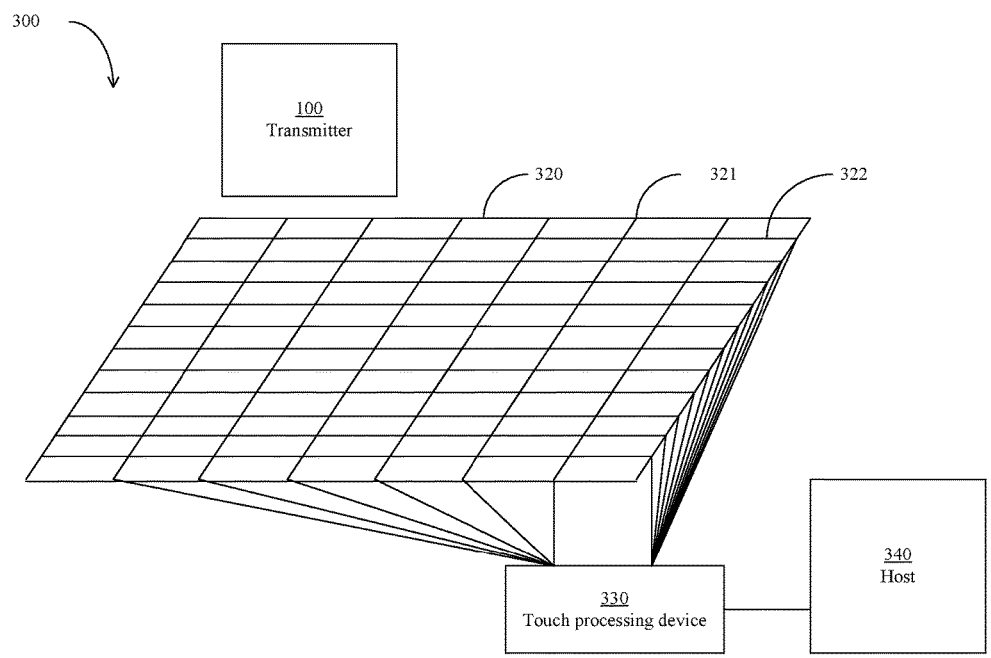
FIG. 3 is a schematic diagram depicting a touch sensitive system in accordance with an embodiment of the present invention.

Referring now to FIG. 3, a schematic diagram depicting a touch sensitive system 300 in accordance with an embodiment of the present invention is shown. The touch sensitive system 300 includes at least one transmitter 100, a touch sensitive panel 320, a touch processing device 330 and a mainframe 340. In this embodiment, the transmitter 100 is applicable to the transmitters described in the previous embodiments, especially the embodiments shown in FIGS. 1 and 2. It should also be noted that the touch sensitive system 300 may include a plurality of transmitters 100. The touch sensitive panel 320 is formed on a substrate. The touch sensitive panel 320 can be a touch sensitive screen, but the present invention does not restrict the form of the touch sensitive panel 320.

In an embodiment, a touch sensitive area of the touch sensitive panel 320 includes a plurality of first electrodes 321 and a plurality of second electrodes 322. A plurality of sensing points are formed at the intersections of these two electrodes. These first electrodes 321 and second electrodes 322 are connected to the touch processing device 330. Under mutual capacitive sensing, the first electrodes 321 can be called first conductive strips or driving electrodes and the second electrodes 322 can be called second conductive strips or sensing electrodes. The touch processing device 330 is able to know the approach or touch (approach/touch) of any external conductive object on the touch sensitive panel 320 by first providing a driving voltage to the first electrodes 321 and then measuring the signal variations of the second electrodes 322. One with ordinary skills in the art can appreciate that the touch processing device 330 may use mutual- or self-capacitive sensing methods to detect an approaching/touching event or object, and they will not be further described. In addition to mutual- or self-capacitive sensing methods, the touch processing device 330 may also detect the electrical signal emitted by the transmitter 100 in order to detect the relative position of the transmitter 100 with respect to the touch sensitive panel 320. The detection principle will be detailed in the later sections of the specification.

FIG. 3 further includes a mainframe 340, which can be an operating system such as a CPU or a main processor in an embedded system, or other types of computers. In an embodiment, the touch sensitive system 300 can be a table PC. The mainframe 340 can be a CPU for executing the operating programs of the table PC. For example, the table PC executes an Android operating system, and the mainframe 340 is an ARM processor executing the Android operating system. The present invention does not limit the form of information transmission between the mainframe 340 and the touch processing device 330 as long as the information transmitted is relevant to the approaching/touching event(s) happened on the touch sensitive panel 320.

Figure 4:
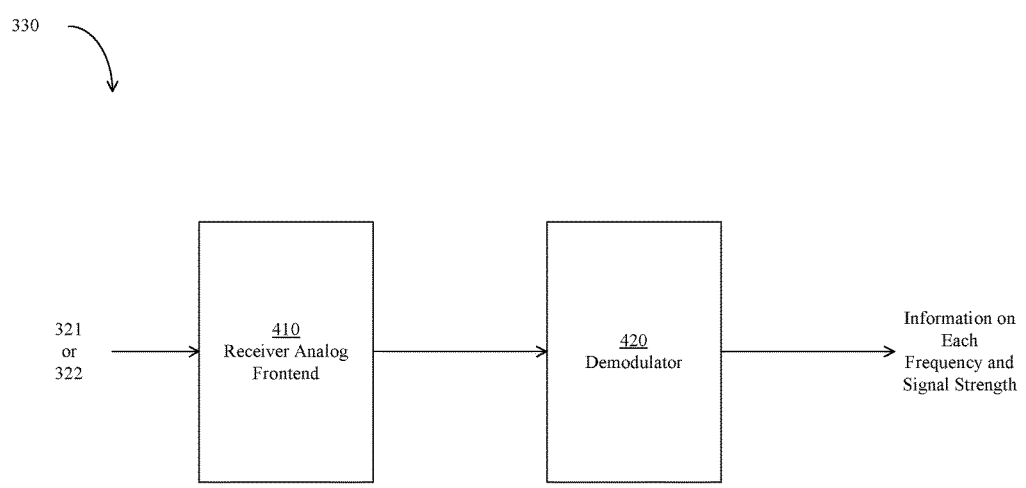
FIG. 4 is a block diagram depicting a portion of the touch processing device in accordance with an embodiment of the present invention.

Referring to FIG. 4, a block diagram depicting a portion of the touch processing device 330 in accordance with an embodiment of the present invention is shown. As mentioned earlier, the touch processing device 330 may use mutual- or self-capacitive sensing principle to detect an approaching/touching event, so details related to capacitive sensing will not be described hereinafter. The embodiment shown in FIG. 4 includes a receiver analog front end 410 and a demodulator 420.

The receiver analog front end 410 is connected to the first electrodes 321 or the second electrodes 322 described before. In an embodiment, each of the first electrodes 321 and each of the second electrodes 322 are connected to a receiver analog front end 410, respectively. In another embodiment, a plurality of first electrodes 321 form a set, and a plurality of second electrodes 322 form a set, and each set of first electrodes 321 corresponds to a receiver analog front end 410, and each set of second electrodes 322 corresponds to another receiver analog front end 410. Each receiver analog front end 410 receives in turn the signal of the first electrodes 321 or second electrodes 322 in the set. In another embodiment, a set of first electrodes 321 and a set of second electrodes 322 correspond to one receiver analog front end 410. The receiver analog front end 410 can first be connected in turn to the first electrodes 321 in the set of the first electrodes 321, and then connected in turn to the second electrodes 322 in the set of the second electrodes 322. On the contrary, the receiver analog front end 410 can first be connected in turn to the second electrodes 322 in the set of the second electrodes 322, and then connected in turn to the first electrodes 321 in the set of the first electrodes 321. In an embodiment, the touch processing device 330 may include only one receiver analog front end 410. One with ordinary skills in the art can appreciate that the present invention does not limit how the first electrodes 321 or the second electrodes 322 are configured to the receiver analog front end 410. In other words, the number of receiver analog front ends 410 included in the touch processing device 330 may be smaller than or equal to the sum of the first electrodes 321 and the second electrodes 322.

The receiver analog front end 410 may perform some filtering, amplifying or other types of analog signal processing. In some embodiments, the receiver analog front end 410 can receive the difference between two adjacent first electrodes 321, or the difference between two adjacent second electrodes 322. In an embodiment, each receiver analog front end 410 can output to a demodulator 420. In another embodiment, every $n^{th}$ receiver analog front end 410 may output to a demodulator 420. In yet another embodiment, each receiver analog front end 410 may output to N demodulators 420, wherein N is a positive integer greater than or equal to one. In some embodiments, the touch processing device 330 may include only one demodulator 420. One with ordinary skills in the art can appreciate that the present invention does not limit how the receiver analog front end(s) 410 is/are configured to the demodulator(s) 420.

The demodulator 420 is used to demodulate the electrical signal transmitted by the transmitter 100 in order to obtain information on each frequency and information on the signal strengths in the received signals of the corresponding first electrodes 321 or second electrodes 322. For example, the transmitter 100 may transmit a signal having three frequencies. The demodulator 420 may obtain the signal strengths for these three frequencies, the ratio(s) of signal strengths of each two or arbitrary two frequencies, and the overall signal strength. In the present invention, the demodulator 420 can be implemented in a digital or analog way; it is described in the following three embodiments.

Figure 5:
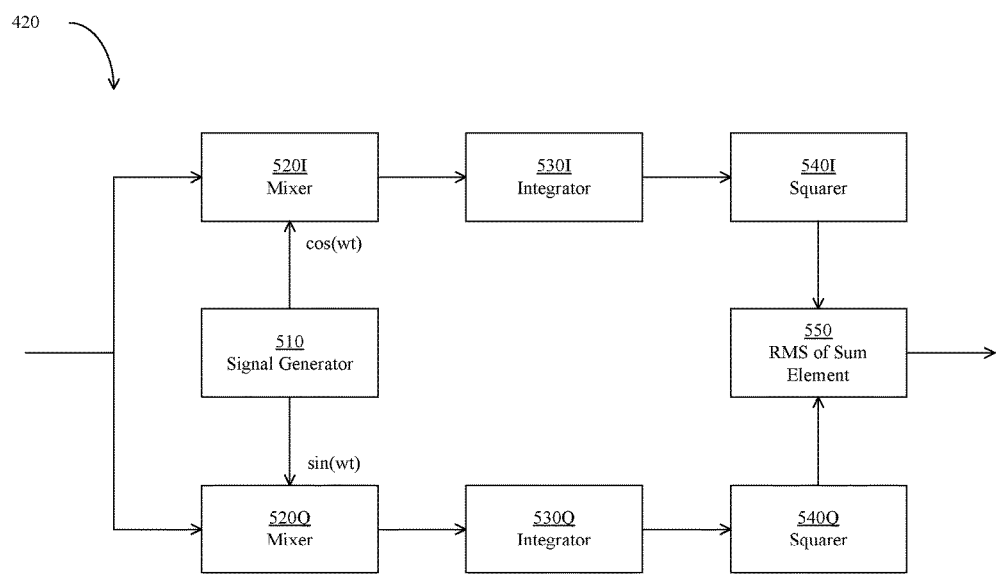
FIG. 5 is a block diagram depicting a portion of an analog demodulator in accordance with an embodiment of the present invention.

Referring to FIG. 5, a block diagram depicting a portion of an analog demodulator 420 in accordance with an embodiment of the present invention is shown. A single analog demodulator shown in FIG. 5 can be used to demodulate every frequency, or a plurality of analog demodulators shown in FIG. 5 can be used to demodulate a plurality of frequencies. For example, when the transmitter 100 transmits N frequencies, N of the analog demodulator shown in FIG. 5 are used to demodulate each of the frequencies. A signal generator 510 is used to generate signals of corresponding frequencies.

An analog signal received from the receiver analog front end 410 can be passed through an optional amplifier (not shown) and then to two mixers 520I and 520Q. The mixer 520I receives a cosine signal outputted by the signal generator 510, while the mixer 520Q receives a sine signal outputted by the signal generator 510. The mixer signals outputted by the mixers 520I and 520Q are then sent to integrators 530I and 530Q, respectively. Then, the integrated signals are sent to squarers 540I and 540Q by the integrators 530I and 530Q, respectively. Finally, the outputs of the squarers 540I and 540Q are summed and then root-mean-squared by a "Root Mean Square (RMS) of Sum" element. As such, the signal strengths corresponding to the signal frequencies generated by the signal generator 510 can be obtained. After the signal strengths of all frequencies are obtained, the ratio(s) of the signal strengths of each two or arbitrary two frequencies and the overall signal strength can then be generated.

Figure 6:
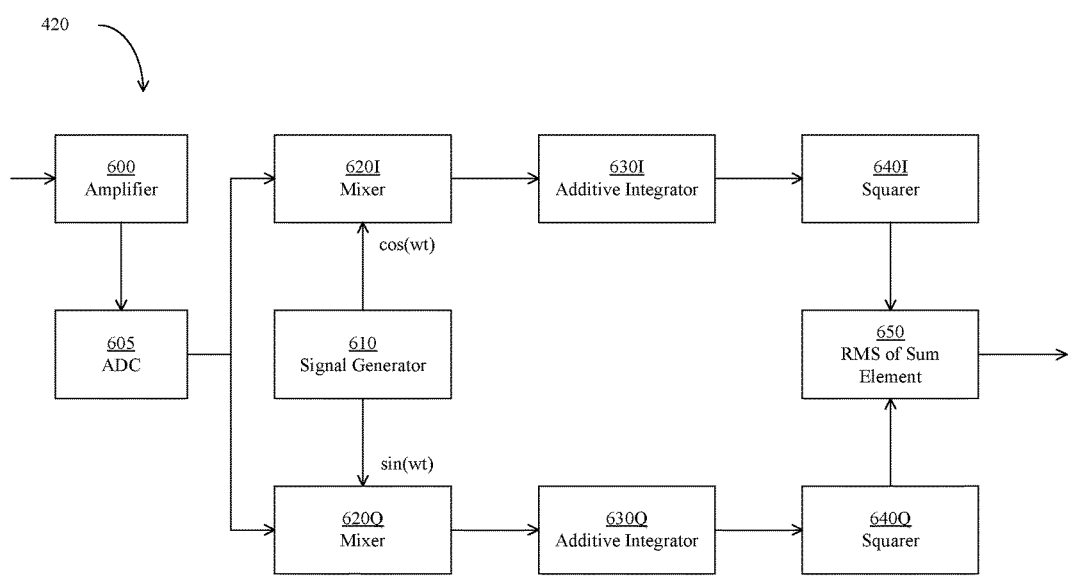
FIG. 6 is a block diagram depicting a portion of a digital demodulator in accordance with an embodiment of the present invention.

Referring to FIG. 6, a block diagram depicting a portion of a digital demodulator 420 in accordance with an embodiment of the present invention is shown. Compared to the embodiment shown in FIG. 5, the embodiment shown in FIG. 6 is carried out in a digital manner. Similarly, a single digital demodulator shown in FIG. 6 can be used to demodulate every frequency, or a plurality of the digital demodulators shown in FIG. 6 can be used to demodulate a plurality of frequencies. For example, when the transmitter 100 transmits N frequencies, N of the digital demodulator shown in FIG. 6 are used demodulate each of the frequencies. A signal generator 610 is used to generate digital signals of corresponding frequencies.

An analog signal received from the receiver analog front end 410 can be passed through an optional amplifier 600 and then to an analog-to-digital converter (ADC) 605. The sampling frequency of the ADC 605 will correspond to the frequency of the signal transmitted by the signal generator 610. In other words, when the ADC 605 is performing one sampling, the signal generator 610 will send out signals to two mixers 620I and 620Q once. The mixer 620I receives a cosine signal outputted by the signal generator 610, while the mixer 620Q receives a sine signal outputted by the signal generator 610. The mixer signals outputted by the mixers 620I and 620Q are then outputted to addition integrators 630I and 630Q, respectively. Then, the addition-integrated signals are sent to squarers 640I and 640Q by the addition integrators 630I and 630Q, respectively. Finally, the outputs of the squarers 640I and 640Q are summed and root-mean-squared by a "Root Mean Square (RMS) of Sum" element. As such, the signal strengths corresponding to the signal frequencies generated by the signal generator 610 can be obtained. After the signal strengths of all frequencies are obtained, the ratios of the signal strengths of each two frequencies and the overall signal strength can then be generated.

Figure 7:
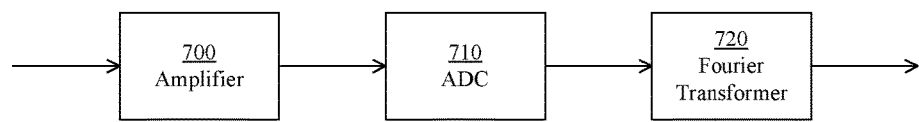
FIG. 7 is a block diagram depicting a portion of a digital demodulator in accordance with an embodiment of the present invention.

Referring to FIG. 7, a block diagram depicting a portion of a digital demodulator 420 in accordance with an embodiment of the present invention is shown. The embodiment shown in FIG. 7 is carried out in a digital manner, and a single digital demodulator shown in FIG. 7 can be used to demodulate every frequency. An analog signal received from the receiver analog front end 410 can be passed through an optional amplifier 700 and then to an analog-to-digital converter (ADC) 705. Then, the outputted digital signal is sent to a Fourier transformer 720 to demodulate the signal strength of each frequency on the frequency domain. The above Fourier transformer can be a digitalized Fast Fourier transformer.

Figure 8:
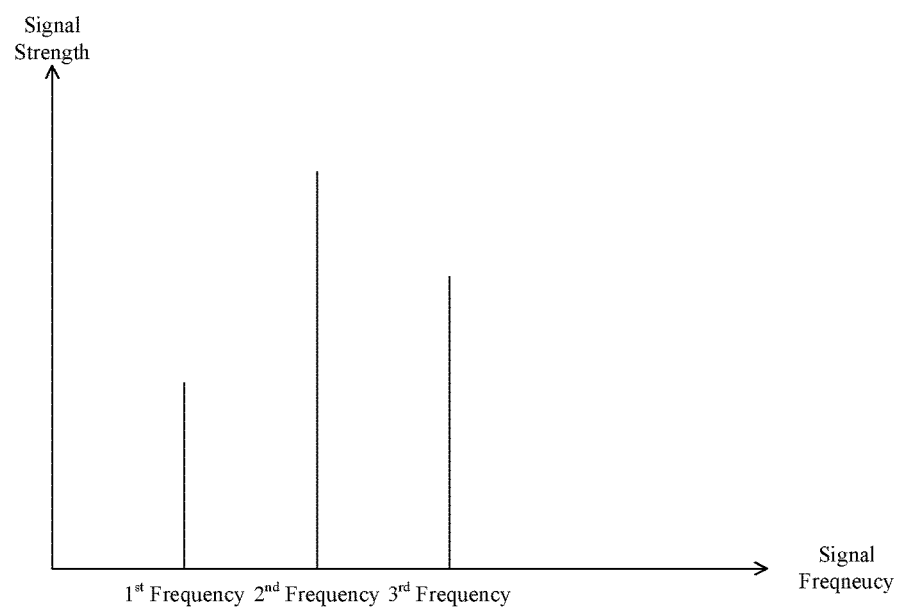
FIG. 8 is a schematic diagram depicting the result of demodulation according to the digital demodulator of FIG. 7.

Referring to FIG. 8, a schematic diagram depicting the result of demodulation according to the digital demodulator 420 of FIG. 7 is shown. The result shown in FIG. 8 is merely an illustration, in addition to being represented by a diagram; other kinds of data structure can be used to store the result of demodulation. The horizontal axis shown in FIG. 8 indicates the signal frequency, and the vertical axis thereof indicates the signal strength. The calculated result from the Fourier transformer 720 gives the signal strengths corresponding to N frequencies possibly transmitted by the transmitter 100. In an embodiment, a threshold can be set for the signal strength. Only a signal with strength greater than the threshold would be regarded as a signal having a corresponding frequency. When the signal strength of each frequency is obtained, the ratios of each two frequencies and the overall signal strength can then be calculated.

Although the embodiments of the three demodulators 420 provided in FIGS. 5 to 7 can be implemented in the touch processing device 330 shown in FIG. 3, but the present invention does not restrict that the touch processing device 330 must implement all the steps of the demodulator 420. In some embodiments, some steps of the demodulator 420 can be performed by the mainframe 340. It should be noted that although the embodiments of the demodulators 420 can be implemented by specific hardware, but one with ordinary skills in the art can appreciate that each elements of the demodulators 420 can be implemented through software or firmware. For example, the mixers can be implemented by multiplication, and the addition integrators can be implemented by addition. Multiplication and addition are among the most common operation instructions in ordinary processors.

Figure 9A:
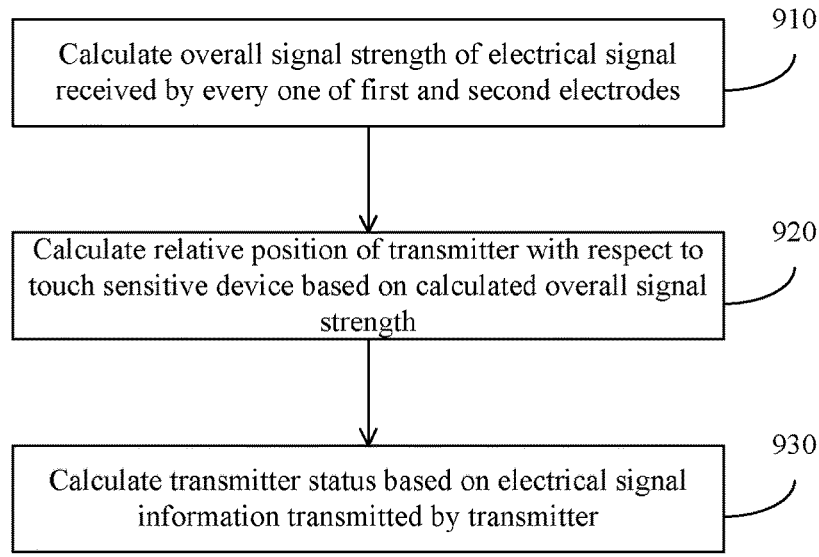
FIG. 9A is a flowchart illustrating a method for sensing a transmitter in accordance with an embodiment of the present invention.

Referring to FIG. 9A, a flowchart illustrating a method for sensing a transmitter in accordance with an embodiment of the present invention is shown. In step S910, the overall signal strength of the electrical signal received by every one of the first and second electrodes is calculated. Step 910 can be implemented using the embodiments shown in FIGS. 3 to 7. Then, in step 920, based on the calculated overall signal strength, a relative position of the transmitter with respect to a touch sensitive device is calculated. In an embodiment, the position of the transmitter is thought to be corresponding to the first and second electrodes having the largest overall signal strengths. In another embodiment, the position of the transmitter is thought to be corresponding to the centroid of adjacent first and second electrodes having the largest overall signal strengths, the magnitude of the masses of these electrodes correspond to the strength of the signals. Finally, in an optional step 930, based on information of the electrical signal transmitted by the transmitter, a transmitter status is calculated. One with ordinary skills in the art can appreciate that the implementation of step 930 can be deduced from the tables previously described.

Figure 9B:
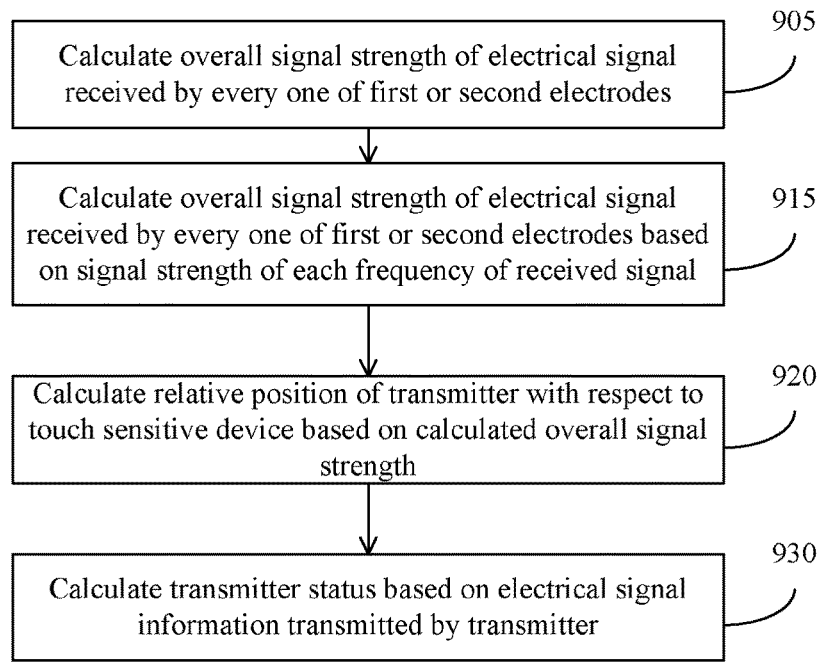
FIG. 9B is a flowchart illustrating a method for sensing a transmitter in accordance with an embodiment of the present invention.

Referring to FIG. 9B, a flowchart illustrating a method for sensing a transmitter in accordance with an embodiment of the present invention is shown. In step 905, the overall signal strength of the electrical signal received by every first or second electrode is calculated. Once the electrical signal received by a first or second electrode is demodulated, the frequencies of the signal transmitted by the transmitter can be known. For example, if the transmitter transmits a first frequency and a second frequency, but not a third frequency, then in the calculation of overall signal strengths of another electrode carried out in step 915, the calculation of the third frequency can be omitted. If the digital demodulator shown in FIG. 7 is employed, then the method shown in FIG. 9B is not required. However, if the demodulator described with respect to FIG. 5 or FIG. 6 is employed, and that the number of demodulators is not be enough to scan all frequencies in one go, then the method of FIG. 9B can save some time and computing resources. Moreover, if after the calculations of the first electrodes or the second electrodes, no electrical signal transmitted by the transmitter is found, step 915 can be bypassed. On the contrary, if the electrical signal transmitted by the transmitter is found, then step 915 can calculate the overall signal strength of the electrical signal received by another electrode based on the signal strength of each frequency of the received electrical signal. The descriptions of the embodiment of FIG. 9A apply to the remaining steps 920 and 930.

It should be noted that in the processes of FIGS. 9A and 9B, if no cause-and-effect relationships or order between the steps are mentioned, then the present invention does not limit the order in which these steps are carried out. In addition, in steps 905, 910 and 915, the overall signal strength of the electrical signal of every first and/or second electrode(s) is mentioned. In an embodiment, if the touch sensitive system 300 includes only a single transmitter 100, the processes of FIGS. 9A and 9B will be modified to: if the overall strength of the electrical signal received by at least one first electrode and second electrode is calculated to be greater than a threshold, then execute steps 920 and 930.

In an embodiment, the present invention provides a method for detecting a transmitter approximating or touching a touch sensitive device. The transmitter transmits an electrical signal mixed by signals having a plurality of frequencies. The touch sensitive device includes a plurality of first electrodes, a plurality of second electrodes and a plurality of sensing points intersected by those first and second electrodes. The method includes the following steps of: calculating the total signal strength of the electrical signal received by each of the first electrodes and second electrodes; and calculating a relative position between the transmitter and the touch sensitive device according to the calculated total signal strengths.

The above step of calculating the total signal strength of the electrical signal received by each of the first electrodes and second electrodes further includes: calculating the strength of a signal corresponding to each of the plurality of frequencies in the received electrical signal; and summing all of the calculated strengths of signals corresponding to the plurality of frequencies. In an embodiment, the above step of calculating the strength of a signal corresponding to a particular frequency of the plurality of frequencies further includes: mixing an in-phase signal with the received signal to generate an in-phase analog signal, mixing an quadrature signal with the received signal to generate an quadrature analog signal, wherein the frequency of the in-phase signal and the quadrature signal is the particular frequency; performing integration on the in-phase analog signal to generate an in-phase integration signal, performing integration on the quadrature analog signal to generate an quadrature integration signal; and calculating the root mean square of the sum of the square of the in-phase integration signal and the square of the quadrature integration signal to obtain the signal strength corresponding to the particular frequency. In another embodiment, the above step of calculating the strength of a signal corresponding to a particular frequency of the plurality of frequencies further includes: performing analog-to-digital conversion on the received signal to produce a digital received signal; mixing an in-phase signal with the digital received signal to generate an in-phase digital signal; mixing an quadrature signal with the received signal to generate an quadrature digital signal, wherein the frequency of the in-phase signal and the quadrature signal is the particular frequency; performing addition integration on the in-phase digital signal to generate an in-phase integration signal; performing addition integration on the quadrature digital signal to generate an quadrature integration signal; and calculating the root mean square of the sum of the square of the in-phase integration signal and the square of the quadrature integration signal to obtain the strength of signal corresponding to the particular frequency. The frequency of the analog-to-digital conversion corresponds to the particular frequency. In still another embodiment, the above step of calculating the strength of a signal corresponding to a particular frequency of the plurality of frequencies further includes: performing analog-to-digital conversion on the received signal to produce a digital received signal; and performing Fourier transform on the digital received signal to generate the strength of the signal corresponding to each frequency of the plurality of frequencies.

The above step of calculating the total signal strength of the electrical signal received by each of the first electrodes and second electrodes further includes: calculating the total signal strength of the electrical signal received by each first electrode; calculating the strength of a signal corresponding to each of the plurality of frequencies based on the electrical signal received by at least one first electrode to obtain a set of frequencies mixed by the transmitter; and calculating the total signal strength corresponding to all of the frequencies in the set of frequencies in the electrical signal received by the second electrode, wherein a signal strength corresponding to each frequency in the set of frequencies is greater than a threshold.

In an embodiment, while calculating the total signal strength of the electrical signal received by a particular first electrode, the total signal strength of the electrical signal received by a particular second electrode is calculated.

The transmitter transmits the electrical signal according to a transmitter status. The method further includes calculating the transmitter status based on the information of the electrical signal. The above calculating the transmitter status is based on one or any arbitrary combination of the following information of the electrical signal: the signal strength of a particular frequency in the plurality of frequencies mixed by the electrical signal; the total signal strength of the electrical signal; and the ratio of signal strengths of a first frequency to a second frequency in the plurality of frequencies mixed by the electrical signal. In an embodiment, the total signal strength of the electrical signal corresponds to the status of a sensor with n-ary possible statuses in the transmitter. In another embodiment, the ratio of the signal strengths of the first frequency to the second frequency mixed by the electrical signal corresponds to the status of a sensor with n-ary possible statuses in the transmitter. In still another embodiment, the total signal strength of the electrical signal corresponds to the status of a first sensor with n-ary possible statuses in the transmitter, wherein the ratio of signal strengths of the first frequency to the second frequency in the plurality of frequencies mixed by the electrical signal corresponds to the status of a second sensor with n-ary possible statuses in the transmitter.

In an embodiment, when the transmitter includes a plurality of sensors, the number of possible statuses of the transmitter status is the sum of the number of possible statuses of every one of the plurality of sensors. In another embodiment, the transmitter status indication is one of arbitrary combinations of every sensor's status indication.

The present invention provides a touch processing device for detecting a transmitter approximating or touching a touch sensitive device. The transmitter transmits an electrical signal mixed by signals having a plurality of frequencies. The touch sensitive device includes a plurality of first electrodes, a plurality of second electrodes and a plurality of sensing points intersected by those first and second electrodes. The touch processing device is used for: calculating the total signal strength of the electrical signal received by each of the first electrodes and second electrodes; and calculating a relative position between the transmitter and the touch sensitive device according to the calculated total signal strengths.

The above step of calculating the total signal strength of the electrical signal received by each of the first electrodes and second electrodes further includes: calculating the strength of a signal corresponding to each of the plurality of frequencies in the received electrical signal; and summing all of the calculated strengths of signals corresponding to the plurality of frequencies. In an embodiment, the touch processing device further includes a demodulator for calculating the strength of a signal corresponding to a particular frequency of the plurality of frequencies. The demodulator further includes: a signal generator for generating an in-phase signal and an quadrature signal, wherein the frequency of the in-phase signal and the quadrature signal is the particular frequency; at least a mixer for mixing the in-phase signal with the received signal to generate an in-phase analog signal, and mixing the quadrature signal with the received signal to generate an quadrature analog signal; at least an integrator for performing integration on the in-phase analog signal to generate an in-phase integration signal, and performing integration on the quadrature analog signal to generate an quadrature integration signal; at least a squarer for calculating the square of the in-phase integration signal and the square of the quadrature integration signal; and at least a "Root Mean Square (RMS) of Sum" element for calculating the root mean square of the sum of the square of the in-phase integration signal and the square of the quadrature integration signal to obtain the signal strength corresponding to the particular frequency. In another embodiment, the touch processing device further includes a demodulator for calculating the strength of a signal corresponding to a particular frequency of the plurality of frequencies. The demodulator further includes: an analog-to-digital converter (ADC) for performing analog-to-digital conversion on the received signal to produce a digital received signal; a signal generator for generating an in-phase signal and an quadrature signal, wherein the frequency of the in-phase signal and the quadrature signal is the particular frequency; at least a mixer for mixing the in-phase signal with the digital received signal to generate an in-phase digital signal, and mixing the quadrature signal with the digital received signal to generate an quadrature digital signal; at least an addition integrator for performing addition integration on the in-phase digital signal to generate an in-phase integration signal, and performing integration on the quadrature digital signal to generate an quadrature integration signal; at least a squarer for calculating the square of the in-phase integration signal and the square of the quadrature integration signal; and at least a "Root Mean Square (RMS) of Sum" element for calculating the root mean square of the sum of the square of the in-phase integration signal and the square of the quadrature integration signal to obtain the signal strength corresponding to the particular frequency. In still another embodiment, the touch processing device further includes a demodulator for calculating the strength of a signal corresponding to each of the plurality of frequencies. The demodulator further includes: an analog-to-digital converter (ADC) for performing analog-to-digital conversion on the received signal to produce a digital received signal; and a Fourier Transformer for performing Fourier Transform on the digital received signal to generate the strength of the signal corresponding to each of the plurality of frequencies.

In an embodiment, the step of calculating the total signal strength of the electrical signal received by each of the first electrodes and second electrodes further includes: calculating the total signal strength of the electrical signal received by each first electrode; calculating the strength of a signal corresponding to each of the plurality of frequencies based on the electrical signal received by at least one first electrode to obtain a set of frequencies mixed by the transmitter; and calculating the total signal strength corresponding to all of the frequencies in the set of frequencies in the electrical signal received by the second electrode, wherein a signal strength corresponding to each frequency in the set of frequencies is greater than a threshold.

While calculating the total signal strength of the electrical signal received by a particular first electrode, the total signal strength of the electrical signal received by a particular second electrode is calculated.

The transmitter transmits the electrical signal according to a transmitter status. The touch processing device further includes calculating the transmitter status based on the information of the electrical signal. The above calculating the transmitter status is based on one or any arbitrary combination of the following information of the electrical signal: the signal strength of a particular frequency in the plurality of frequencies mixed by the electrical signal; the total signal strength of the electrical signal; and the ratio of signal strengths of a first frequency to a second frequency in the plurality of frequencies mixed by the electrical signal.

In an embodiment, the total signal strength of the electrical signal corresponds to the status of a sensor with n-ary possible statuses in the transmitter. In another embodiment, the ratio of the signal strengths of the first frequency to the second frequency mixed by the electrical signal corresponds to the status of a sensor with n-ary possible statuses in the transmitter. In still another embodiment, the total signal strength of the electrical signal corresponds to the status of a first sensor with n-ary possible statuses in the transmitter, wherein the ratio of signal strengths of the first frequency to the second frequency in the plurality of frequencies mixed by the electrical signal corresponds to the status of a second sensor with n-ary possible statuses in the transmitter.

In an embodiment, when the transmitter includes a plurality of sensors, the number of possible statuses of the transmitter status is the sum of the number of possible statuses of every one of the plurality of sensors. In another embodiment, the transmitter status indication is one of arbitrary combinations of every sensor's status indication.

The present invention provides a touch processing system for detecting a transmitter approximating or touching a touch sensitive device. The transmitter transmits an electrical signal mixed by signals having a plurality of frequencies. The touch processing system includes: the touch sensitive device including a plurality of first electrodes, a plurality of second electrodes and a plurality of sensing points intersected by those first and second electrodes; and a touch processing device for calculating the total signal strength of the electrical signal received by each of the first electrodes and second electrodes; and calculating a relative position between the transmitter and the touch sensitive device according to the calculated total signal strengths.

In summary, one of the main principles of the present invention lies in detecting the signal strengths corresponding to a plurality of frequencies in the signal received by the first electrodes and the second electrodes in order to calculate a relative position of the transmitter with respect to the touch sensitive device, and to obtain the statues of various sensors on the transmitter based on the derived transmitter status. Moreover, the present invention may also make use of the touch sensitive electrodes of capacitive touch sensitive panels, thus allowing the same capacitive touch sensitive panel to perform both capacitive sensing and the detection of the transmitter. In other words, the same capacitive touch sensitive panel can be used for the detections of fingers, palms, as well as transmitter-type styli.

Referring back to FIG. 3, various kinds of buses or physical connections may be employed between the touch processing device 330 and the mainframe 340. For example, a high-speed bus such as PCI-Express, HyperTransport, SLI or CrossFire or a low speed transmission interface such as USB, I²C or SPI can be used. In addition, information can be transmitted in a "shared-memory" manner between the two. The present invention does not limit the type of connection between the two as long as the transmitted information is related to touch sensitive information.

In an embodiment, the transmitted information may include a relative position of the transmitter 100 with respect to the touch sensitive panel 320 and the transmitter status. The mainframe 340 can be transparent to how the touch processing device 330 calculates the relative position and the transmitter status. This embodiment is more appropriate for a low-speed bus. In another embodiment, the touch processing device 330 may only detect and collect touch sensitive signals, while higher-end functions are performed by the mainframe 340. As such, the cost of the touch processing device 330 can be reduced, and the more powerful mainframe 340 with larger computational resources can be fully utilized. Moreover, it is easier to update the software of the mainframe 340, so it is more flexibility to modify, correct, update and add touch sensitive functions.

For the mainframe 340, the touch sensitive panel 320 includes a plurality of sensing points. Each sensing point is composed of a pair of intersecting first electrode 321 and second electrode 322. The sensing information of all the sensing points can be calculated to determine the position of an approaching/touching event. Thus, the touch processing device 330 may provide various two-dimensional (2D) sensing information to the mainframe 340. In an embodiment, the 2D sensing information corresponds to every sensing point on the touch sensitive panel 320. However, in another embodiment, the 2D sensing information corresponds to a portion of the sensing points on the touch sensitive panel 320. The present invention does not limit the number of sensing points to which the 2D sensing information corresponds, as long as the 2D sensing information corresponds to two or more first electrodes 321 and second electrodes 322.

In an embodiment, when a plurality of the first electrodes 321 of the touch sensitive panel 320 transmits a driving signal, the transmitter 100 will transmit an electrical signal upon detecting the driving signal. The electrical signal can then be detected by the demodulator as mentioned before, or by a capacitive detecting module 1030. If the signal is detected by the demodulator, then the frequencies mixed in the electrical signal as well as the particular second electrodes 322 detecting the signal can be determined. If the signal is detected by the capacitive detecting module 1030, only the particular second electrodes 322 detecting the signal can be determined.

In a mutual-capacitive detection embodiment, since the capacitive detecting module 1030 instructs the plurality of the first electrodes 321 to transmit the driving signal sequentially, if the transmitter 100 does not detect the driving signal transmitted by a particular first electrode 321, it will not generate an electrical signal. As a result, none of the first electrodes 321 will detect any electrical signal. However, if the transmitter 100 detects the driving signal transmitted by a particular first electrode 321, it will generate an electrical signal. Thus, a transmitter detecting module 1010 will know that the transmitter 100 is close to that particular first electrode 321. Further, some second electrodes 322 will also detect the electrical signal, so the transmitter detecting module 1010 and/or the capacitive detecting module 1030 may also know that the transmitter is close to those second electrodes 322. As such, simply using the signals received by the plurality of second electrodes 322, a 2D sensing information can be obtained. Furthermore, using the signals received by all of the second electrodes 322 in the same period of time, the transmitter detecting module 1010 may generate a 2D sensing information, and the capacitive detecting module 1030 may also generate a 2D sensing information.

In an embodiment, a 2D sensing information may include the strength of the signals transmitted by the transmitter 100. In another embodiment, a 2D sensing information may include the signal strength of a plurality of frequencies mixed by the transmitter. For example, the transmitter mixes three frequencies, so a 2D sensing information includes the signal strength of a first frequency, another 2D sensing information includes the signal strength of a second frequency, and yet another 2D sensing information includes the signal strength of a third frequency. In this embodiment, since the signal strengths of these three frequencies are known to the mainframe 340, the signal strengths of the various frequencies with respect to the same sensing point can be added together to obtain the strength of the signal transmitted by the transmitter 100.

The 2D sensing information above does not necessarily include absolute values; it may also include relative values. For example, after the signal strength of a first frequency is transmitted, the 2D sensing information may include the difference between the signals strengths of the second frequency and the first frequency, and the differences between the signal strengths of the third frequency with respect to the first/second frequencies. Alternatively, the 2D sensing information may include the ratio of the signals strengths of the second frequency to the first frequency and the ratios of the signal strengths of the third frequency to the first/second frequencies. In an embodiment, the signal strength of the total signal can be transmitted first, and the ratios of each frequency with respect to the total signal are then transmitted. It is mentioned earlier that the modulation of some information involves the use of ratios of the signal strengths of some frequencies, so by transmitting the ratios, the computations performed by the mainframe 340 can be omitted. Of course, the mainframe 340 may also perform restoring calculations on the differences or ratios to restore the original signal strengths.

In an embodiment, the touch processing device 330 may know that the electrical signal transmitted by the transmitter 100 is a mix of first and second frequencies during a previous detection, so the touch processing device 330 can transmit two 2D sensing information; the first 2D sensing information corresponds to the first frequency, and the second 2D sensing information corresponds to the second frequency. In a latter detection, due to a change in the transmitter status in the transmitter 100, the electrical signal transmitted by the transmitter 100 is a mixture of the first frequency, the second frequency and a third frequency, the touch processing device 330 will then have to transmit three 2D sensing information, especially a third 2D sensing information corresponding to the third frequencies. On the other hand, during a latter detection, due to a change in the transmitter status in the transmitter 100, the electrical signal transmitted by the transmitter 100 includes only a single frequency; the touch processing device 330 will only need to transmit one 2D sensing information. Nonetheless, the present invention does not restrict the touch processing device 330 to transmitting only a corresponding 2D sensing information for any received frequency. In an embodiment, the touch processing device 330 may transmit a corresponding 2D sensing information for each of the supported frequencies, regardless of whether they are mixed by the transmitter 100 or not.

The above 2D sensing information may include a plurality of one-dimensional (1D) sensing information. In an embodiment, each 1D sensing information may include the sensing information of all the sensing points along one axial direction. In another embodiment, a 1D sensing information may include the sensing information of a portion of sensing points along one axial direction. For example, when the signal strength corresponding to this partial sensing point is not a zero value, the 1D sensing information records the positions of the non-zero sensing points and their signal strengths. These 1D sensing information are called Line Piece (LPC). In other words, the above 2D sensing information may include a plurality of line pieces. Of course, a 1D sensing information included in the line piece may also be a zero value. For example, when the line piece may represent the difference between the signal strengths of a frequency and another frequency, the difference may be zero.

As mentioned before, when the touch processing device 330 transmits touch sensitive information to the mainframe 340, it may include a plurality of 2D sensing information. These 2D sensing information may be transmitted in a time-division multiplexing manner. For example, the signal strength of a first frequency with respect to a first horizontal axis is transmitted first, then the signal strength of a second frequency with respect to the first horizontal axis is transmitted. After that, the signal strength of the first frequency with respect to a second horizontal axis is transmitted first, then the signal strength of a second frequency with respect to the second horizontal axis is transmitted, and so on until the signal strengths of the first and second frequencies with respect to all the horizontal axes are transmitted. Upon receiving them, the mainframe 340 may divide them into two 2D sensing information; the first 2D sensing information concerns the signal strengths of the first frequency with respect to all the sensing points, and the second 2D sensing information concerns the signal strengths of the second frequency with respect to all the sensing points. In another embodiment, the touch processing device 330 may transmit a first 2D sensing information first, and then transmit a second 2D sensing information. The present invention does not limit the manner in which the 2D sensing information are transmitted.

In addition to detection of the transmitter 100, the touch processing device 330 may also perform capacitive sensing through the plurality of the first electrodes 321 and the second electrodes 322. For example, the first electrodes 321 are sequentially supplied with a driving voltage, and the changes in capacitances are measured on the second electrodes 322 for projected capacitive sensing, or the change in capacitance of each electrode is measured sequentially for self capacitive sensing. When performing capacitive sensing, the touch processing device 330 may generate a 2D capacitive sensing information corresponding to the measured capacitances. These 2D capacitive sensing information can be used for finding an external conductive object approaching or touching the touch sensitive panel 320.

In an embodiment, since the touch processing device 330 performs transmitter detection at a different time from capacitive sensing, so the 2D capacitive sensing information is transmitted separately from the abovementioned plurality of 2D sensing information. However, in another embodiment, the touch processing device 330 can temporary store a particular kind of 2D sensing information, and transmit the transmitter detection information and the capacitive sensing information in a time-division multiplex manner. For example, the touch processing device 330 may transmit the signal strength of a first frequency with respect to a first horizontal axis, then the signal strength of a second frequency with respect to the first horizontal axis, and finally the capacitive sensing information with respect to the first horizontal axis. Subsequently, the touch processing device 330 may transmit the signal strength of the first frequency with respect to a second horizontal axis, then the signal strength of the second frequency with respect to the second horizontal axis, and finally the capacitive sensing information with respect to the second horizontal axis, and so forth until the signal strengths of the first and second frequencies and the capacitive sensing information with respect to all the horizontal axes are transmitted.

The present invention does not restrict the abovementioned capacitive sensing information, it can be a 2D capacitive sensing information made up of a plurality of 1D sensing information, or a plurality of line pieces. The above 1D sensing information can be information such as the original value of sensed capacitance, a difference in sensed capacitance between adjacent electrodes and/or a dual difference.

To the mainframe 340, these 2D sensing information can be regarded as frames of images. The mainframe 340, upon obtaining these images, can use various kinds of image processing techniques to carry out subsequent processes such as detection of an approaching/touching event, recognition and classification of an approaching/touching event, trajectory tracking of an approaching/touching event, command or text interpretation after trajectory tracking and the like.

Figure 10:
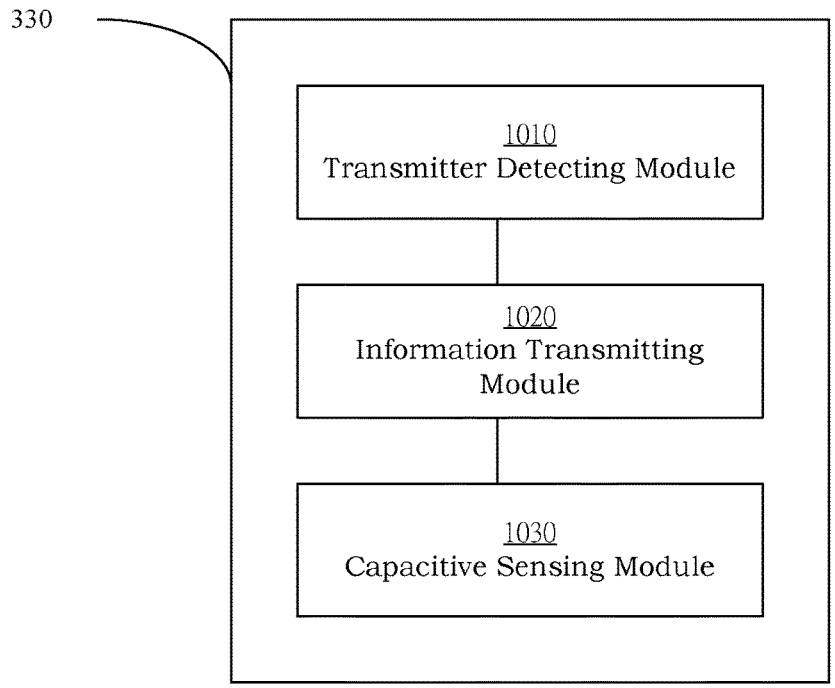
FIG. 10 is a block diagram illustrating a touch processing device in accordance with an embodiment of the present invention.

Referring to FIG. 10, a block diagram illustrating a touch processing device 330 in accordance with an embodiment of the present invention is shown. The touch processing device 330 includes a transmitter detecting module 1010, an information transmitting module 1020, and a capacitive sensing module 1030. The capacitive sensing module 1030 is an optional module, some of its circuits or elements can be shared with the transmitter detecting module 1010. The present invention does not restrict the implementation of the touch processing device 330; software, hardware or a combination of the above can be used to implement the various modules of the touch processing device 330.

The transmitter detecting module 1010 is configured to detect a transmitter that transmits an electrical signal only when approaching or touching a touch sensitive panel, and generate at least one 2D sensing information. The at least one 2D sensing information is a sensing information corresponding to a plurality of sensing points with respect to at least one frequency. The information transmitting module 1020 is configured to transmit the at least one 2D sensing information.

The optional capacitive sensing module 1030 is configured to detect an external conductive object approaching or touching the touch sensitive panel, and generate a 2D capacitive sensing information. The information transmitting module is further configured to transmit the 2D capacitive sensing information. In an embodiment, the 2D sensing information and the 2D capacitive sensing information are alternately transmitted in whole. In another embodiment, the 2D sensing information and the 2D capacitive sensing information are alternately transmitted in parts.

When the electrical signal is mixed by a plurality of frequencies, the transmitter detecting module 1010 is configured to generate a plurality of 2D sensing information, and the information transmitting module 1020 is configured to transmit the plurality of 2D sensing information, wherein each frequency corresponds to one of the plurality of 2D sensing information, and the number of 2D sensing information generated by the transmitter detecting module 1010 is larger than or equal to the number of frequencies included in the electrical signal.

In an embodiment, a first 2D sensing information in the plurality of 2D sensing information includes a relative value with respect to a second 2D sensing information, wherein the relative value is one of the following: a difference, a ratio, and a fractional value.

In an embodiment, each of the plurality of 2D sensing information is alternately transmitted in whole. In an embodiment, each of the plurality of 2D sensing information is alternately transmitted in parts.

In an embodiment, the transmitter transmits the electrical signal only in response to detecting a driving signal sent by the capacitive sensing module. In some embodiments, the capacitive sensing module allows a plurality of first electrodes on the touch sensitive panel to sequentially send out the driving signal. The 2D sensing information are sensed from a plurality of second electrodes on the touch sensitive panel. In some other embodiments, the capacitive sensing module allows a plurality of first electrodes on the touch sensitive panel to simultaneously send out the driving signal. The 2D capacitive sensing information and the 2D sensing information are generated according to signals received in the same period of time.

Figure 11:
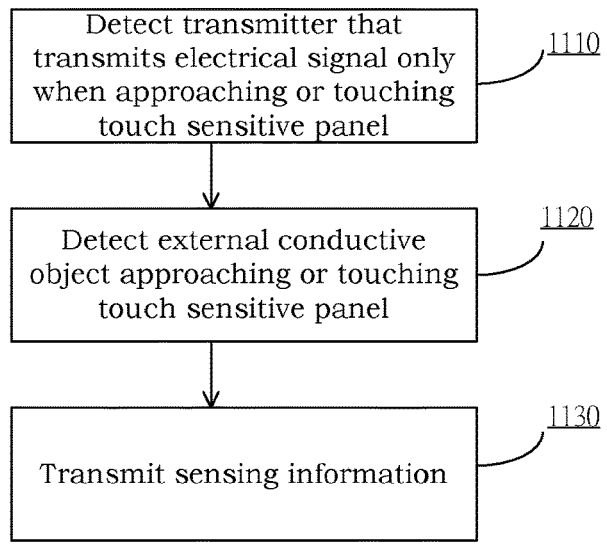
FIG. 11 is a flowchart illustrating a touch processing method in accordance with an embodiment of the present invention.

Referring to FIG. 11, a flowchart illustrating a touch processing method in accordance with an embodiment of the present invention is shown. The touch processing method is applicable to a touch processing device connected to a touch sensitive panel having a plurality of sensing pints. In step 1110, a transmitter that transmits an electrical signal only when approaching or touching the touch sensitive panel is detected, and at least one 2D sensing information is generated, wherein the at least one 2D sensing information is a sensing information corresponding to the plurality of sensing points with respect to at least one frequency. In an optional step 1120, an external conductive object approaching or touching the touch sensitive panel is detected, and a 2D capacitive sensing information is generated. In step 1130, the at least one 2D sensing information and the optional 2D capacitive sensing information are transmitted. In an embodiment, the 2D sensing information and the 2D capacitive sensing information are alternately transmitted in whole. In another embodiment, the 2D sensing information and the 2D capacitive sensing information are alternately transmitted in parts.

When the electrical signal is mixed by a plurality of frequencies, the step 1110 further includes generating a plurality of 2D sensing information. The step 1130 further includes transmitting the plurality of 2D sensing information, wherein each frequency corresponds to one of the plurality of 2D sensing information, wherein the number of 2D sensing information is larger than or equal to the number of frequencies included in the electrical signal.

In an embodiment, a first 2D sensing information in the plurality of 2D sensing information includes a relative value with respect to a second 2D sensing information, wherein the relative value is one of the following: a difference, a ratio, or a fractional value.

In an embodiment, each of the plurality of 2D sensing information is alternately transmitted in whole. In an embodiment, each of the plurality of 2D sensing information is alternately transmitted in parts.

In an embodiment, the method further includes allowing the touch sensitive panel to send out a driving signal, and the transmitter transmits the electrical signal only in response to detecting the driving signal. In some embodiments, the method further includes allowing a plurality of first electrodes on the touch sensitive panel to sequentially send out the driving signal. The method further includes sensing the 2D sensing information from a plurality of second electrodes on the touch sensitive panel. In some other embodiments, the method further includes allowing a plurality of first electrodes on the touch sensitive panel to simultaneously send out the driving signal. The 2D capacitive sensing information and the 2D sensing information are generated according to signals received in the same period of time.

In summary, one of the main principles of the present invention lies in that the touch processing device is capable of providing sensing information with respect to various frequencies as well as optional capacitive sensing information to allow a receiving end to generate various kinds of images for subsequent processing using the same touch sensitive panel.

Referring back to the embodiments shown in FIGS. 5 and 6, the embodiment shown in FIG. 5 is an analog demodulator 420 including two squarers 540I and 540Q and a "RMS of sum" element 550; and the embodiment shown in FIG. 6 is a digital demodulator 420 including two squarers 640I and 640Q and a "RMS of sum" element 650. In implementation, the squarers and the "RMS of sum" element would occupy a considerable amount of chip area. If each demodulator 420 includes the squarers and the "RMS of sum" element as described, a huge amount of chip area will be occupied.

In order to solve this problem, the squarers and/or the "RMS of sum" element can be placed in the information transmitting module 1020 shown in FIG. 11. In an embodiment, the information transmitting module 1020 dismantles each 2D sensing information into a plurality of 1D sensing information in a serial manner and transmits them to the mainframe 340 sequentially. In other words, the information transmitting module 1020 may receive analog or digital in-phase integration signal and quadrature integration signal and transmit these signals to the two squarers, respectively. Then, the outputs of these two squarers are passed into a "RMS of sum" element for operation. Finally, the result of the operation is outputted. As such, the problem of occupying too much chip area by multiple demodulators 420 can be addressed. Moreover, if the information transmitting module 1020 transmits using a lower-speed connection, then the time taken for the above operation will be unlikely to slow down the transmission speed.

In another embodiment, the information transmitting module 1020 may include only one RMS element while squarers and an adder remain in each demodulator. In yet another embodiment, the information transmitting module 1020 may include only an adder and a RMS element while squarers remain in each demodulator.

It should be noted that, as the squaring, the addition and the RMS operations take up different amounts of time, the amount of these various circuits can be further adjusted to maintain a continuous transmission. For example, if the time required for the RMS operation is five times longer than that required for the addition operation, then the number of RMS elements can be five times as much as that of the adders. If the time required for the squaring operation is twice longer than that required for the addition operation, then the number of squarers can be made to be four times as much as that of the adders (since two squaring operations are required for one addition operation). One with ordinary skills in the art can appreciate that in order to accommodate the transmission speed of the information transmitting module 1020, the number of these circuits can also be adjusted adaptively.

Furthermore, the squaring, the addition and the RMS operations can be carried out by the mainframe 340. In other words, the information transmitting module 1020 may pass certain values to the mainframe 340. In an embodiment, the squaring operations may remain in the demodulators 420, the addition operation is carried out by the information transmitting module 1020, and the RMS operation is carried out by the mainframe 340. In another embodiment, the squaring and the addition operations are carried out by the information transmitting module 1020, and the RMS operation is carried out by the mainframe 340. The present invention does not set limit as to which modules or elements perform which specific operations.

In the embodiments above, specific circuits are used for carrying out operations, but the present invention is not limited to carrying out operations using hardware circuits, software can be used for carryout out operations instead. For example, hardware can be used for the more complex squaring operations, software can be used for addition operation, and hardware can be used for speeding up the RMS operation. When software is used, computing cores that supports multimedia computing instruction set or specific instruction set can be considered.

Figure 12:
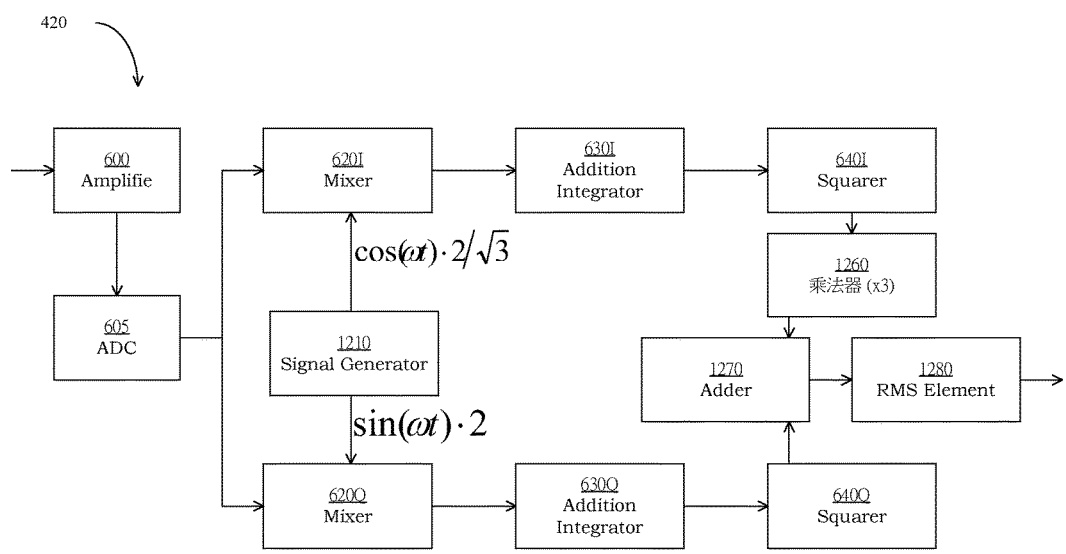
FIG. 12 is a block diagram illustrating a digital demodulator in accordance with an embodiment of the present invention.

Referring to a digital demodulator 420 shown in FIG. 12, which is a modification of the digital demodulator 420 shown in FIG. 6. Since one only needs to determine if the electrical signal emitted by the transmitter 100 corresponds to the signal of a particular frequency, so the sampling frequency of the ADC 605 and a signal generator 1210 can be lower. In an embodiment, sampling and mixing is performed every 60 degrees. For example, the signal generator 1210 generates a signal at 30 degrees, 90 degrees, 150 degrees, 210 degrees, 270 degrees, and 330 degrees, and the ADC 605 samples at the same times. In these phases, the sinusoidal signal values sent from the signal generator 610 of FIG. 6 to the mixer 620Q are ½, 1, ½, −½, −1 and −½, respectively; and the cosine signal values sent from the signal generator 610 of FIG. 6 to the mixer 620I are $\sqrt{3}/2$, 0, $\sqrt{3}/2$, −$\sqrt{3}/2$, and −$\sqrt{3}/2$, respectively. If the above sinusoidal signal values are multiplied by two, then the values sent from the signal generator 1210 of FIG. 12 to the mixer 620Q are all integer, and the multiplication performed by the mixer 620Q does not need to involve floating points, the mixer 620Q only needs to multiple the values by 1, 2, 1, −1, −2 and −1, respectively. Similarly, if the above cosine signal values are multiplied by $2/\sqrt{3}$, then the values sent from the signal generator 1210 of FIG. 12 to the mixer 620I are all integer, and the multiplication performed by the mixer 620Q does not need to involve floating points, the mixer 620Q only needs to multiple the values with 1, 0, 1, −1, 0 and −1, respectively.

Compared to the signals sent to the mixer 620Q, the signals sent to the mixer 620I are further divided by $\sqrt{3}$, so the values obtained in squarer 640I has to be tripled by a multiplier 1260 to obtain values equivalent to those obtained in squarer 640Q. The outputs of the multiplier 1260 and the squarer 640Q are sent to an adder 1270. Finally, the result obtained from a RMS element 1280 is double the result obtained from the demodulator 420 shown in FIG. 6. If the demodulated signal strength of every electrode is doubled, then the ratios of signal strengths between all the frequencies remain the same.

As described earlier, the RMS operation would take longer to perform, so it can be moved to the information transmitting module 1020 or the mainframe 340. In this embodiment, since the squarers 640I and 640Q, the multiplier 1260 and the adder 1270 all perform calculations on integers, only the RMS element 1280 will create floating points. If the floating-point operation is moved out of the demodulator 420, it can greatly reduce the complexity of the demodulator 420.

Figure 13:
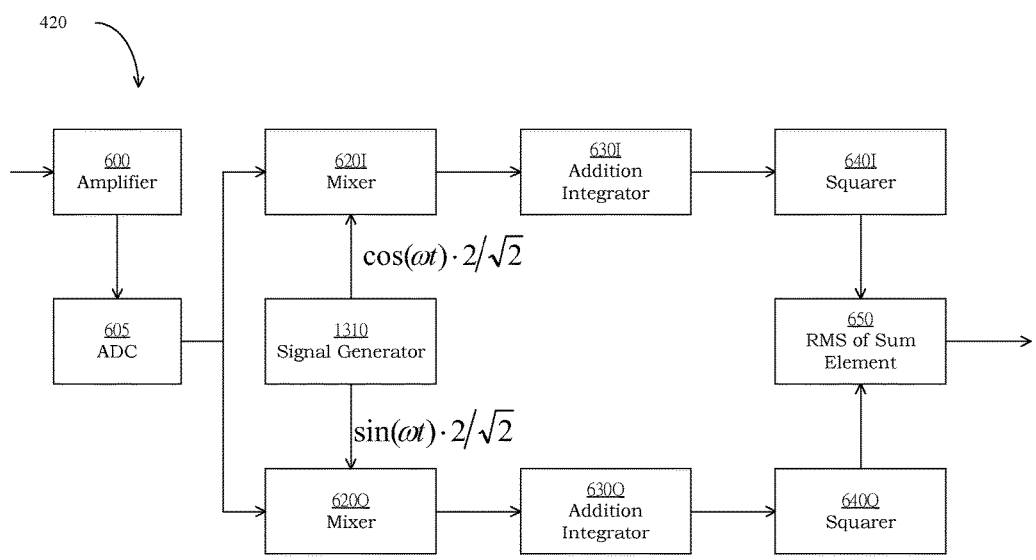
FIG. 13 is a block diagram illustrating a digital demodulator in accordance with an embodiment of the present invention.

Referring to a digital demodulator 420 shown in FIG. 13, which is a modification of the digital demodulator 420 shown in FIG. 6. This demodulator 420 is different from that shown in FIG. 12 in that the signal generator 1310 of FIG. 13 creates a value every 90 degrees, and the ADC also performs sampling every 90 degrees. The signal generator 1310 generates digital values at 45 degrees, 135 degrees, 225 degrees, and 315 degrees. For the sinusoidal values, the values corresponding to these phases are $\sqrt{2}/2$, $\sqrt{2}/2$, −$\sqrt{2}/2$, and −$\sqrt{2}/2$, respectively. As for the cosine values, the values corresponding to these phases are $\sqrt{2}/2$, −$\sqrt{2}/2$, −$\sqrt{2}/2$, and $\sqrt{2}/2$, respectively. If both the sinusoidal and cosine values are multiplied by $2/\sqrt{2}$, then at the various phases, the sinusoidal values become 1, 1, −1 and −1, respectively; and the cosine values become 1, −1, −1, and 1, respectively. As both are multiplied by the same factor, the multiplication operations are both performed on integers. Finally, the result obtained from the RMS element 650 is double that obtained from the demodulator 420 of FIG. 6. If the demodulated signal strength of every electrode is doubled, then the ratios of signal strengths between all the frequencies remain the same.

As described earlier, the RMS operation would take longer to perform, so it can be moved to the information transmitting module 1020 or the mainframe 340. In this embodiment, since the squarers 640I and 640Q both perform calculations on integers, only the "RMS of sum" element 650 will create floating points. If the floating-point operation is moved out of the demodulator 420, it can greatly reduce the complexity of the demodulator 420.

In another embodiment, a right triangle with integer sides generated according to the Pythagorean theorem can be used to determine the phases of the digital values. For example, when the three sides of a right triangle is 3:4:5, the sinusoidal or cosine value can be ⅗ or ⅘. If both are multiplied by five, it allows the digital demodulator 420 to perform integer operations. However, in this embodiment, the phases at which the signal generator generates and the ADC samples are not the same, unlike the previous two examples.

Figure 14:
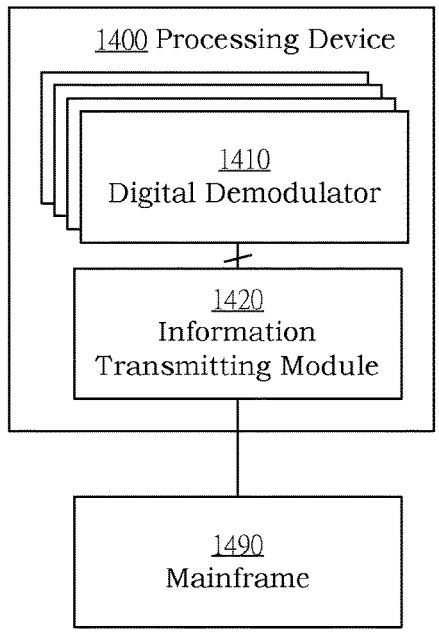
FIG. 14 is a block diagram illustrating a processing device in accordance with an embodiment of the present invention.

Referring now to FIG. 14, a block diagram illustrating a processing device 1400 in accordance with an embodiment of the present invention is shown. The processing device 1400 includes a plurality of digital demodulators 1410 and an information transmitting module 1420. Each of the digital demodulators 1410 is configured to generate in-phase and quadrature signal information corresponding to a frequency. The information transmitting module 1420 is configured to receive, process, and transmit the in-phase and quadrature signal information generated by the plurality of digital demodulators 1410.

In an embodiment, each digital demodulator 1410 includes: an analog-to-digital converter (ADC) for sampling and converting an input signal to a digital received signal; a signal generator for generating a corresponding in-phase signal and a corresponding quadrature signal based on the sampling points of the ADC and the frequency; at least one mixer for mixing the in-phase signal and the digital received signal to generate an in-phase digital signal and mixing the quadrature signal and the digital received signal to generate a quadrature digital signal; and at least one addition integrator for performing addition integration on the in-phase digital signal to create an in-phase integration signal and performing addition integration on the quadrature digital signal to create a quadrature integration signal.

In a particular embodiment, the information transmitting module 1420 is configured to transmit the in-phase and quadrature signal information including the in-phase integration signal and the quadrature integration signal to a mainframe 1490. The mainframe 1490 performs squaring on the in-phase integration signal and the quadrature integration signal and then performs the root mean square (RMS) operation of the sum to obtain the signal strength of the signal received by the digital demodulator with respect to the frequency corresponding to the in-phase and quadrature signal information.

In another embodiment, the information transmitting module 1420 is configured to perform squaring on the in-phase integration signal and the quadrature integration signal and calculate the sum, and then transmit the in-phase and quadrature signal information including the sum to a mainframe 1490. The mainframe 1490 performs RMS operation on the sum to obtain the signal strength of the signal received by the digital demodulator with respect to the frequency corresponding to the in-phase and quadrature signal information.

In yet another embodiment, the information transmitting module 1420 is configured to perform squaring on the in-phase integration signal and the quadrature integration signal and calculate the RMS of sum in order to obtain the signal strength of the signal received by the digital demodulator with respect to the frequency, and then transmit the signal strength.

In a particular embodiment, the above mixer and addition integrator both perform operations on integers. For example, the signal generator generates a set of in-phase and quadrature signals every 60 degrees. The ADC also performs sampling every 60 degrees. At 30 degrees, 90 degrees, 150 degrees, 210 degrees, 270 degrees, and 330 degrees, the sinusoidal signal values generated by the signal generator are 1, 2, 1, −1, −2, and −1, respectively; and the cosine signal values are 1, 0, 1, −1, 0, and −1, respectively. In another example, the signal generator generates a set of in-phase and quadrature signals every 90 degrees. The ADC also performs sampling every 90 degrees. At 45 degrees, 135 degrees, 225 degrees, and 315 degrees, the sinusoidal signal values generated by the signal generator are 1, 1, −1, and −1, respectively; and the cosine signal values are 1, −1, −1, and 1, respectively.

In another embodiment, each digital demodulator 1410 further includes: at least one squarer for calculating the square of the in-phase integration signal and the square of the quadrature signal; and an adder for calculating the sum of the squares of the in-phase integration signal and the quadrature signal. The information transmitting module 1420 performs RMS operation on the sum to obtain the signal strength of the signal received by the digital demodulator 1410 with respect to the frequency, and transmits the signal strength. In another embodiment, the information transmitting module 1420 is configured to transmit the in-phase and quadrature signal information including the sum to a mainframe 1490. The mainframe 1490 performs RMS operation on the sum to obtain the signal strength of the signal received by the digital demodulator 1410 with respect to the frequency corresponding to the in-phase and quadrature signal information.

In an embodiment, the processing speed of the information transmitting module matches its transmission speed.

Figure 15:
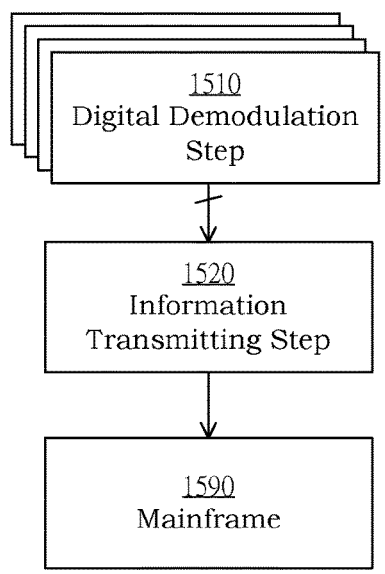
FIG. 15 is a flowchart illustrating a processing method in accordance with an embodiment of the present invention.

Referring now to FIG. 15, a flowchart illustrating a processing method in accordance with an embodiment of the present invention is shown. The processing method includes: simultaneously performing a plurality of digital demodulation steps 1510, each digital demodulation step 1510 generating in-phase and quadrature signal information corresponding to a frequency; and performing an information transmitting step 1520 which involves receiving, processing and transmitting the in-phase and quadrature signal information generated by the plurality of digital demodulation steps.

In an embodiment, the digital demodulation step 1510 further includes: performing analog-to-digital conversion (ADC) on a received signal to generate a digital received signal; mixing an in-phase signal and the digital received signal to generate an in-phase digital signal and mixing a quadrature signal and the digital received signal to generate a quadrature digital signal, wherein the frequency of the in-phase signal and the quadrature signal is said frequency; and performing addition integration on the in-phase digital signal to create an in-phase integration signal; and performing addition integration on the quadrature digital signal to create a quadrature integration signal.

The processing and transmitting step 1520 further includes: transmitting the in-phase and quadrature signal information including the in-phase integration signal and the quadrature integration signal to a mainframe 1590. The mainframe 1590 is configured to perform squaring on the in-phase integration signal and the quadrature integration signal and then perform the root mean square (RMS) operation of the sum to obtain the signal strength of the signal received by the digital demodulation step 1510 with respect to the frequency corresponding to the in-phase and quadrature signal information.

In another embodiment, the processing and transmitting step 1520 further includes: performing squaring on the in-phase integration signal and the quadrature integration signal and calculating the sum thereof, and then transmitting the in-phase and quadrature signal information including the sum to a mainframe 1590. The mainframe 1590 is configured to perform RMS operation on the sum to obtain the signal strength of the signal received by the digital demodulation step 1510 with respect to the frequency corresponding to the in-phase and quadrature signal information.

In yet another embodiment, the processing and transmitting step 1520 further includes: performing squaring on the in-phase integration signal and the quadrature integration signal and calculating the RMS of sum in order to obtain the signal strength of the signal received by the digital demodulation step 1510 with respect to the frequency corresponding to the in-phase and quadrature signal information, and then transmitting the signal strength.

The mixing step and the addition integration step both perform operations on integers. For example, a set of in-phase and quadrature signals is generated every 60 degrees. The ADC step also performs sampling every 60 degrees. At 30 degrees, 90 degrees, 150 degrees, 210 degrees, 270 degrees, and 330 degrees, the sinusoidal signal values generated are 1, 2, 1, −1, −2, and −1, respectively; and the cosine signal values are 1, 0, 1, −1, 0, and −1, respectively. In another example, a set of in-phase and quadrature signals is generated every 90 degrees. The ADC step also performs sampling every 90 degrees. At 45 degrees, 135 degrees, 225 degrees, and 315 degrees, the sinusoidal signal values generated are 1, 1, −1, and −1, respectively; and the cosine signal values are 1, −1, −1, and 1, respectively.

Each of the digital demodulation steps 1510 further includes: calculating the sum of the square of the in-phase integration signal and the square of the quadrature signal. The processing and transmitting step further includes: performing RMS operation on the sum to obtain the signal strength of the signal received by the digital demodulation step 1510 with respect to the frequency, and transmitting the signal strength. The processing and transmitting step further includes: transmitting the in-phase and quadrature signal information including the sum to a mainframe 1590. The mainframe 1590 is configured to perform RMS operation on the sum to obtain the signal strength of the signal received by the digital demodulation step 1510 with respect to the frequency corresponding to the in-phase and quadrature signal information.

In an embodiment, in the processing and transmitting step, the speed of the processing step matches the speed of the transmitting step.

In conclusion, one of the main principles of the present invention is to simplify the sampling and computing performed by the digital demodulators, and to gather the more complicated operations into a single digital transmission interface, or even a mainframe with more abundant computing resources. As such, the chip area occupied by each of the demodulators can be minimized.

What is claimed is:

1. A digital demodulator, comprising:
   an analog-to-digital converter (ADC) for sampling and converting an input signal to a digital received signal;
   a signal generator for generating a corresponding in-phase signal and a corresponding quadrature signal based on the sampling points of the ADC and a frequency, wherein the signal generator generates a set of in-phase and quadrature signals every 60 degrees, and the ADC also performs sampling every 60 degrees, wherein at 30, 90, 150, 210, 270 and 330 degrees, the signal values corresponding to a sinusoidal wave generated by the signal generator are 1, 2, 1, −1, −2 and −1, respectively; and the signal values corresponding to a cosine wave generated by the signal generator are 1, 0, 1, −1, 0 and −1, respectively;
   at least one mixer for mixing the in-phase signal and the digital received signal to generate an in-phase digital signal and mixing the quadrature signal and the digital received signal to generate a quadrature digital signal; and
   at least one addition integrator for performing addition integration on the in-phase digital signal to generate an in-phase integration signal and performing addition integration on the quadrature digital signal to generate a quadrature integration signal,
   wherein the mixer and the addition integrator both perform operations on integers.

2. The digital demodulator of claim 1, further comprising:
   at least one squarer for calculating a square of the in-phase integration signal and a square of the quadrature integration signal; and
   an adder for calculating a sum of the squares of the in-phase integration signal and the quadrature signal.

3. The digital demodulator of claim 2, further comprising:
   a Root-Mean-Square (RMS) element for performing RMS operation on the sum to obtain a signal strength of the input signal.

4. A digital demodulator, comprising:
   an analog-to-digital converter (ADC) for sampling and converting an input signal to a digital received signal;
   a signal generator for generating a corresponding in-phase signal and a corresponding quadrature signal based on the sampling points of the ADC and a frequency, wherein the signal generator generates a set of in-phase and quadrature signals every 90 degrees, and the ADC also performs sampling every 90 degrees, wherein at 45, 135, 225 and 315 degrees, the signal values corresponding to a sinusoidal wave generated by the signal generator are 1, 1, −1 and −1, respectively; and the signal values corresponding to a cosine wave generated by the signal generator are 1, −1, −1 and 1, respectively;
   at least one mixer for mixing the in-phase signal and the digital received signal to generate an in-phase digital signal and mixing the quadrature signal and the digital received signal to generate a quadrature digital signal; and
   at least one addition integrator for performing addition integration on the in-phase digital signal to generate an in-phase integration signal and performing addition integration on the quadrature digital signal to generate a quadrature integration signal,
   wherein the mixer and the addition integrator both perform operations on integers.

5. The digital demodulator of claim 4, further comprising:
   at least one squarer for calculating a square of the in-phase integration signal and a square of the quadrature integration signal; and
   an adder for calculating a sum of the squares of the in-phase integration signal and the quadrature signal.

6. The digital demodulator of claim 5, further comprising:
   a Root-Mean-Square (RMS) element for performing RMS operation on the sum to obtain a signal strength of the input signal.

7. A digital demodulating method, comprising:
   performing analog-to-digital (ADC) on an input signal to generate a digital received signal;
   mixing an in-phase signal and the digital received signal to generate an in-phase digital signal;
   mixing a quadrature signal and the digital received signal to generate a quadrature digital signal, wherein a set of the in-phase signal and the quadrature signals is generated every 60 degrees, and the ADC step also performs sampling every 60 degrees, wherein at 30, 90, 150, 210, 270 and 330 degrees, the signal values corresponding to a sinusoidal wave generated by the signal generator are 1, 2, 1, −1, −2 and −1, respectively; and the signal values corresponding to a cosine wave generated by the signal generator are 1, 0, 1, −1, 0 and −1, respectively;
   performing addition integration on the in-phase digital signal to generate an in-phase integration signal; and performing addition integration on the quadrature digital signal to generate a quadrature signal, wherein the mixing step and the addition integration step both perform operations on integers.

8. The digital demodulating method of claim 7, further comprising:

calculating a square of the in-phase integration signal and a square of the quadrature integration signal; and calculating a sum of the squares of the in-phase integration signal and the quadrature signal.

9. The digital demodulating method of claim 8, further comprising:

performing Root-Mean-Square operation on the sum to obtain a signal strength of the input signal.

10. A digital demodulating method, comprising:

performing analog-to-digital (ADC) on an input signal to generate a digital received signal;

mixing an in-phase signal and the digital received signal to generate an in-phase digital signal;

mixing a quadrature signal and the digital received signal to generate a quadrature digital signal, wherein a set of the in-phase signal and the quadrature signals is generated every 90 degrees, and the ADC step also performs sampling every 90 degrees, wherein at 45, 135, 225 and 315 degrees, the signal values corresponding to a sinusoidal wave generated by the signal generator are 1, 1, −1 and −1, respectively; and the signal values corresponding to a cosine wave generated by the signal generator are 1, −1, −1 and 1, respectively;

performing addition integration on the in-phase digital signal to generate an in-phase integration signal; and performing addition integration on the quadrature digital signal to generate a quadrature signal, wherein the mixing step and the addition integration step both perform operations on integers.

11. The digital demodulating method of claim 10, further comprising:

calculating a square of the in-phase integration signal and a square of the quadrature integration signal; and calculating a sum of the squares of the in-phase integration signal and the quadrature signal.

12. The digital demodulating method of claim 11, further comprising:

performing Root-Mean-Square operation on the sum to obtain a signal strength of the input signal.

* * * * *